(12) United States Patent
Zhang et al.

(10) Patent No.: US 11,451,433 B2
(45) Date of Patent: Sep. 20, 2022

(54) SIGNAL TRANSMISSION METHOD, RELATED DEVICE, AND SYSTEM

(71) Applicant: HUAWEI TECHNOLOGIES CO., LTD., Guangdong (CN)

(72) Inventors: Di Zhang, Beijing (CN); Kunpeng Liu, Beijing (CN)

(73) Assignee: Huawei Technologies Co., Ltd., Guangdong (CN)

( * ) Notice: Subject to any disclaimer, the term of this patent is extended or adjusted under 35 U.S.C. 154(b) by 9 days.

(21) Appl. No.: 16/875,551

(22) Filed: May 15, 2020

(65) Prior Publication Data

US 2020/0280483 A1 Sep. 3, 2020

Related U.S. Application Data

(63) Continuation of application No. PCT/CN2018/095512, filed on Jul. 12, 2018.

(30) Foreign Application Priority Data

Nov. 17, 2017 (CN) .......................... 201711153339.5

(51) Int. Cl.
*H04L 12/24* (2006.01)
*H04L 41/0654* (2022.01)
(Continued)

(52) U.S. Cl.
CPC ........ *H04L 41/0672* (2013.01); *H04L 5/0048* (2013.01); *H04W 16/28* (2013.01); *H04W 72/042* (2013.01)

(58) Field of Classification Search
None
See application file for complete search history.

(56) References Cited

U.S. PATENT DOCUMENTS

2016/0036571 A1 2/2016 Park et al.
2016/0270100 A1 9/2016 Ng et al.
(Continued)

FOREIGN PATENT DOCUMENTS

CN 104349460 A 2/2015
CN 104770039 A 7/2015
(Continued)

OTHER PUBLICATIONS

3GPP TS 38.213 V1.0.2 (Oct. 2017), "3rd Generation Partnership Project; Technical Specification Group Radio Access Network; NR; Physical layer procedures for control (Release 15)," Oct. 2017, 23 pages.
(Continued)

*Primary Examiner* — Mansour Oveissi
(74) *Attorney, Agent, or Firm* — Fish & Richardson P.C.

(57) ABSTRACT

This application discloses a signal transmission method, related devices, and a system. The method includes: sending, by a terminal, link reconfiguration request information to a network device at a moment n, where the link reconfiguration request information is used to initiate link reconfiguration; and detecting, by the terminal based on first information, a physical downlink control channel (PDCCH) during a first time period after the moment n. The first information includes QCL information of a first reference signal and a second reference signal. The first reference signal is used to demodulate the PDCCH. The second reference signal is a reference signal meeting a first threshold.

13 Claims, 9 Drawing Sheets

(51) Int. Cl.
*H04L 5/00* (2006.01)
*H04W 16/28* (2009.01)
*H04W 72/04* (2009.01)

(56) References Cited

U.S. PATENT DOCUMENTS

| | | | |
|---|---|---|---|
| 2017/0078994 | A1 | 3/2017 | Dinan |
| 2018/0302889 | A1* | 10/2018 | Guo ...................... H04B 7/088 |
| 2019/0081740 | A1* | 3/2019 | Kaikkonen ............ H04L 5/0055 |
| 2020/0275319 | A1* | 8/2020 | Murray ................. H04W 76/27 |

FOREIGN PATENT DOCUMENTS

| | | |
|---|---|---|
| CN | 105812105 A | 7/2016 |
| CN | 106465374 A | 2/2017 |
| EP | 3151622 A1 | 4/2017 |
| WO | 2017024516 A1 | 2/2017 |
| WO | 2018129300 A1 | 7/2018 |

OTHER PUBLICATIONS

Extended European Search Report issued in European Application No. 18877473.1 dated Dec. 23, 2020, 8 pages.
NTT Docomo Inc., "Further Views on Mechanism to Recover From Beam Failure", 3GPP TSG RAN WG1 NR Ad-Hoc#2, R1-1711076, Qingdao, P.R. China, Jun. 27-30, 2017, 6 pages.
3GPP TS 38.213 V1.0 0 (Sep. 2017),3rd Generation Partnership Project,Technical Specification Group Radio Access Network,NR,Physical layer procedures for control(Release 15), 16 pages.
3GPP TS 38.321 V1.1.0 (Nov. 2017),3rd Generation Partnership Project,Technical Specification Group Radio Access Network,NR,Medium Access Control (MAC) protocol specification(Release 15), 64 pages.
3GPP TS 38.331 V0.1.0 (Oct. 2017),3rd Generation Partnership Project,Technical Specification Group Radio Access Network,NR-,Radio Resource Control (RRC),Protocol specification(Release 15), 42 pages.
3GPP TS 38.214 V1.0.0 (Sep. 2017),3rd Generation Partnership Project,Technical Specification Group Radio Access Network,NR,Physical layer procedures for data (Release 15), 32 pages.
Office Action issued in Chinese Application No. 201910431987.5 dated Aug. 24, 2020, 9 pages (With English Translation).
Office Action issued in Chinese Application No. 201910431847.8 dated Mar. 18, 2020, 9 pages (With English Translation).
Ericsson, "Beam link monitoring in NR," 3GPP TSG-RAN WG2 Meeting #99bis, R2-1711337, Prague, Czech Republic, Oct. 9-13, 5 pages.
Nokia, Nokia Shanghai Bell, "Radio Link Monitoring In NR," 3GPP TSG RAN WG1 Meeting 90bis, R1-1718803, Prague, Czech Republic, Oct. 9-13, 2017, 4 pages.
Office Action issued in Japanese Application No. 2020-526976 dated Jun. 22, 2021, 7 pages (with English translation).
Qualcomm Incorporated, "Discussion on QCL," 3GPP TSG RAN WG1 NR Ad-Hoc #3, R1-1716410, Nagoya, Japan, Sep. 18-21, 2017, 11 pages.
CATT, "NR Radio Link Monitoring," 3GPP TSG RAN WG1 Meeting #90bis, R1-1717805, Prague, CZ, Oct. 9-13, 2017, 6 pages.
Office Action issued in Korean Application No. 2020-7016780 dated Jul. 8, 2022, 4 pages (with English translation).

* cited by examiner

SIGNAL TRANSMISSION METHOD, RELATED DEVICE, AND SYSTEM

CROSS-REFERENCE TO RELATED APPLICATIONS

This application is a continuation of International Application No. PCT/CN2018/095512, filed on Jul. 12, 2018, which claims priority to Chinese Patent Application No. 201711153339.5, filed on Nov. 17, 2017. The disclosures of the aforementioned applications are hereby incorporated by reference in their entireties.

TECHNICAL FIELD

This application relates to the field of wireless communications technologies, and in particular, to a signal transmission method, related devices, and a system.

BACKGROUND

Development of mobile services imposes higher requirements for a data rate and efficiency in wireless communication. A method for improving the data rate and efficiency is to use a frequency band with a very wide bandwidth. However, a propagation path loss grows when a frequency for wireless communication increases. Consequently, a propagation arrival distance becomes relatively short, and a service area (a coverage area) becomes smaller. A beamforming technology is one of important technologies used to mitigate the propagation path loss and resolve the problem that the propagation arrival distance is shortened.

Beamforming may be divided into transmit beamforming performed by a transmit end and receive beamforming performed by a receive end. During transmit beamforming, a plurality of antennas are usually used for centralized propagation in a particular direction to arrive at an area, to enhance directivity. A form in which the plurality of antennas are arranged may be referred to as an antenna array, and each antenna included in the array may be referred to as an array element (array element). The antenna array may be configured into a plurality of types, for example, a linear array and a planar array. When transmit beamforming is used, a transmission distance increases as signal directivity is enhanced. In addition, because a signal is almost not sent to a direction other than a pointed direction, interference to a signal on the peer receive end is significantly reduced. The receive end may perform beamforming on a received signal by using a receive antenna array. During receive beamforming, radio waves are centrally received in a particular direction to enhance sensitivity of received signals emitted from the corresponding direction, and eliminate, from the received signals, a signal emitted from a direction other than the corresponding direction, to provide a gain for blocking an interfering signal.

When a base station and a terminal use a beam for communication, because of blocking by a barrier in a communication process and a poor diffraction capability on a high-frequency channel, a beam of a current service is blocked, and signal transmission cannot continue. Consequently, communication may be interrupted abruptly. In other words, a link fault occurs. During a time period after the link fault occurs and before a new link is properly used, how the terminal receives a physical downlink control channel (Physical Downlink Control Channel, PDCCH) or a physical downlink shared channel (Physical Downlink Shared Channel, PDSCH) delivered by the base station is a technical problem that currently needs to be resolved.

SUMMARY

This application provides a signal transmission method, related devices, and a system, so that during a time period after a link failure occurs and before link communication is recovered to normal, a terminal device can properly receive a PDCCH/PDSCH delivered by a network device, thereby improving link reliability.

According to a first aspect, this application provides a signal transmission method. The method is applied to a terminal side and may include: sending, by a terminal device, link reconfiguration request information to a network device at a moment n, where the link reconfiguration request information is used to initiate link reconfiguration; and detecting, by the terminal device based on first information, a PDCCH during a first time period after the moment n, and/or detecting, by the terminal device based on second information, a PDSCH during a second time period after the moment n. Herein, the first information includes quasi co-location (Quasi Co-location, QCL) assumption information of a first reference signal and a second reference signal. The first reference signal is used to demodulate the PDCCH, in other words, the first reference signal is a demodulation reference signal (Demodulation Reference Signal, DMRS) of the PDCCH. The second reference signal is a reference signal meeting a first threshold. The second information includes QCL information (QCL assumption information) of a third reference signal and a fourth reference signal. The third reference signal is used to demodulate the PDSCH, in other words, the third reference signal is a DMRS of the PDSCH. The fourth reference signal is a reference signal meeting a second threshold.

According to a second aspect, this application provides a signal transmission method. The method is applied to a network device side and may include: receiving, by a network device, link reconfiguration request information sent by a terminal device at a moment n, where the link reconfiguration request information is used to initiate link reconfiguration; and sending, by the network device based on first information, a physical downlink control channel PDCCH during a first time period after the moment n, and/or sending, by the network device based on second information, a physical downlink shared channel PDSCH during a first time period after the moment n. Herein, the first information includes quasi co-location (Quasi Co-location, QCL) assumption information of a first reference signal and a second reference signal. The first reference signal is used to demodulate the PDCCH, in other words, the first reference signal is a demodulation reference signal (Demodulation Reference Signal, DMRS) of the PDCCH. The second reference signal is a reference signal meeting a first threshold. The second information includes QCL information of a third reference signal and a fourth reference signal. The third reference signal is used to demodulate the PDSCH, in other words, the third reference signal is a DMRS of the PDSCH. The fourth reference signal is a reference signal meeting a second threshold.

The quasi co-location QCL assumption information may also be referred to as co-location (Quasi-Co-Location, QCL) assumption. The QCL information is used to assist in describing beamforming information and a receiving process of a receiving side of the terminal device.

To reduce overheads used by the network device side to indicate QCL information to a terminal device side, in an optional implementation, the network device side can indicate that the demodulation reference signal of the PDCCH or the PDSCH and one or more of reference signal resources previously reported by the terminal device meet a QCL relationship. For example, the reference signal may be a channel state information reference signal (Channel State Information Reference Signal, CSI-RS). Herein, each reported CSI-RS resource index is corresponding to one transmit and receive beam pair previously established during measurement performed based on the CSI-RS resource. It should be understood that two reference signals or channels meeting the QCL relationship have same receive beam information. Therefore, based on the reference signal resource index, UE can obtain, through inference, information about a receive beam receiving the PDCCH or the PDSCH.

For example, a receive beam used by the terminal device to receive a demodulation reference signal (Demodulation Reference Signal, DMRS) is the same as a receive beam in a plurality of transmit and receive beam pairs that are previously reported by the terminal device and that are obtained in CSI-RS-based measurement. To be specific, the QCL information may include at least one of the following reported by the terminal device: a beam group index number of the second reference signal, a resource index number of the second reference signal, a port number of the second reference signal, and a port group number of the second reference signal; and the second reference signal is corresponding to one of a plurality of transmit and receive beam pairs that are previously reported by the terminal device and that are obtained in CSI-RS-based measurement. Herein, the beam group index number that is of the second reference signal and that is reported by the terminal device is equivalent to a resource set index number that is of the second reference signal and that is reported by the terminal device. The resource index number that is of the second reference signal and that is reported by the terminal device may be a relative index number in a plurality of resource index number sets based on reporting of the UE. For example, if the terminal device reports four absolute resource index numbers {1, 5, 7, 9} of the second reference signal, according to the result reported by the terminal device, a relative resource index number of the second reference signal is any one of {0, 1, 2, 3}. The relative resource index number 0 is corresponding to the resource index number 1 that is of the second reference signal and that is reported by the terminal device; the relative resource index number 1 is corresponding to the resource index number 5 that is of the second reference signal and that is reported by the terminal device; the relative resource index number 2 is corresponding to the resource index number 7 that is of the second reference signal and that is reported by the terminal device; and the relative resource index number 3 is corresponding to the resource index number 9 that is of the second reference signal and that is reported by the terminal device.

Optionally, the QCL information may also include some spatial feature parameters, for example, an angle of arrival AoA (angle of arrival), a dominant angle of arrival Dominant AoA, an average angle of arrival, a power angular spectrum of an angle of arrival (power angular spectrum (PAS) of AoA), an angle of departure AoD (angle of departure), a dominant angle of departure, an average angle of departure, a power angular spectrum of an angle of departure, terminal transmit beamforming, terminal receive beamforming, spatial channel correlation, base station transmit beamforming, base station receive beamforming, an average channel gain, an average channel delay, a delay spread, a Doppler spread, and spatial receive parameters (spatial Rx parameters). These spatial feature parameters describe features of a spatial channel between an antenna port of the first reference signal and an antenna port of the second reference signal. This helps the terminal device complete a beamforming process or a receiving processing process on the receiving side based on the QCL information.

In this application, that the terminal device detects a PDCCH based on first information means that when the terminal device uses one or more specific receive beams to receive the second reference signal, the terminal device uses the one or more specific receive beams to receive/demodulate the PDCCH. In other words, the PDCCH and the second reference signal meet a QCL relationship, or a DMRS of the PDCCH and the second reference signal meet a QCL relationship.

In this application, that the terminal device detects a PDSCH based on second information means that when the terminal device uses one or more specific receive beams to receive the fourth reference signal, the terminal device uses the one or more specific receive beams to receive/demodulate the PDSCH. In other words, the PDSCH and the fourth reference signal meet a QCL relationship, or a DMRS of the PDCCH and the fourth reference signal meet a QCL relationship.

When the method described in the first aspect is performed, during a time period after a link failure occurs and before link communication is recovered to normal, the terminal device can properly receive the PDCCH/PDSCH delivered by the network device, thereby improving link reliability.

The following separately illustrates an information indication method of this application from the perspective of two physical downlink channels: a PDCCH and a PDSCH.

Scenario 1: The terminal device receives, during a time period after a link failure occurs and before link communication is recovered to normal, the PDCCH delivered by the network device.

The following describes several cases related to the second reference signal described in this application:

Case 1: The second reference signal includes a downlink reference signal associated with the link reconfiguration request information. The downlink reference signal associated with the link reconfiguration request information means that: Before sending the link reconfiguration request information, the terminal device measures quality of downlink reference signals periodically delivered by the network device, to identify (or select) a downlink reference signal that has good channel quality/signal quality, that is, select a downlink beam (which herein means a transmit beam of the network device) that has good channel quality. Then, the terminal device sends the link reconfiguration request information by using an uplink beam (which herein means a terminal transmit beam) corresponding to the downlink beam that has good channel quality, to ensure transmission reliability of the link reconfiguration request information. The downlink beam and an uplink beam corresponding to the downlink beam are a beam pair in a matching relationship. The beam pair is determined in advance by the network device and the terminal device in a beam training process. The beam pair training process is prior to a process in which the terminal device sends the link reconfiguration request information. The identified (or selected) downlink reference signal that has good channel quality/signal quality is the downlink reference signal associated with the link reconfiguration request information.

In this case, when the terminal device uses a specific transmit beam to send the link reconfiguration request information, the terminal device uses a receive beam corresponding to the specific transmit beam, to receive the PDCCH sent by the network device. It should be noted that each terminal transmit beam is corresponding to a receive beam. Herein, that the terminal transmit beam is corresponding to the terminal receive beam means having same directivity. Optionally, the terminal transmit beam and a terminal receive beam corresponding to the terminal transmit beam may be a same beam and can share a same transceiver apparatus. Optionally, an antenna port corresponding to the terminal transmit beam and an antenna port corresponding to the corresponding terminal receive beam may meet QCL.

Case 2: The second reference signal includes a reference signal whose channel quality is higher than the first threshold and that is received by the terminal device after a link failure occurs and before the link reconfiguration request information is sent.

In this case, the terminal device may identify a new beam after the terminal device detects that a communication link fault (or referred to as a communication link failure, a beam fault, a beam failure, a link fault, a link failure, a communication fault, a communication failure, and the like) occurs on a downlink beam of the network device and before the terminal device sends the link reconfiguration request information. To be specific, the network device periodically sends downlink reference signals; after the terminal device detects that the communication link fault occurs on a downlink beam currently used by the network device for communication, the terminal device measures channel quality of the downlink reference signals sent by the network device, to identify a reference signal whose channel quality is higher than the first threshold; and then the terminal device uses a receive beam of the reference signal whose channel quality is higher than the first threshold, to receive the PDCCH sent by the network device. In other words, at this time, assumes that a DMRS of the PDCCH and the reference signal meet a QCL relationship. Herein, meeting the QCL relationship means that when the terminal device uses a specific receive beam to receive the reference signal whose channel quality is higher than the first threshold, the terminal device uses the specific receive beam to receive the PDCCH sent by the network device.

Case 3: The second reference signal includes a reference signal whose channel quality is the best among reference signals whose channel quality is higher than the first threshold and that are received by the terminal device after a link failure occurs and before the link reconfiguration request information is sent.

In this case, the terminal device may identify a new beam after the terminal device detects that a communication link fault occurs on a downlink beam of the network device and before the terminal device sends the link reconfiguration request information. To be specific, the network device periodically sends downlink reference signals; after the terminal device detects that the link fault/failure occurs on a downlink beam currently used by the network device for communication, the terminal device measures channel quality of the downlink reference signals sent by the network device, to identify a reference signal whose channel quality is the best; and then the terminal device uses a receive beam of the reference signal whose channel quality is the best to receive the PDCCH sent by the network device. In other words, at this time, the terminal device assumes that a DMRS of the PDCCH and the reference signal meet a QCL relationship. Herein, meeting the QCL relationship means that when the terminal device uses a specific receive beam to receive the reference signal whose channel quality is the best, the terminal device uses the specific receive beam to receive the PDCCH sent by the network device. Herein, a downlink reference signal whose channel quality is the best means a reference signal whose channel quality is the best among a plurality of reference signals whose channel quality is higher than the first threshold and that are measured by the terminal device. In this application, a reference signal with good channel quality and a reference signal with good signal quality may be understood as a same meaning and both mean that channel quality information (for example, a reference signal received power (Reference Signal Received Power, RSRP) or a channel quality indicator (Channel Quality Indicator, CQI)) of the reference signal is higher than a preset threshold.

Case 4: The second reference signal includes a reference signal whose channel quality is higher than the first threshold and that is received by the terminal device during the first time period.

In this case, the terminal device may train a new beam after the terminal device sends the link reconfiguration request information. To be specific, after receiving the link reconfiguration request information sent by the terminal device, the network device sends a downlink reference signal; the terminal device measures channel quality of the downlink reference signal sent by the network device, to identify the reference signal whose channel quality is higher than the first threshold; and then the terminal device uses a receive beam of the reference signal whose channel quality is higher than the first threshold, to receive the PDCCH sent by the network device. In other words, at this time, the terminal device assumes that a DMRS of the PDCCH and the reference signal meet a QCL relationship. Herein, meeting the QCL relationship means that when the terminal device uses a specific receive beam to receive the reference signal whose channel quality is higher than the first threshold, the terminal device uses the specific receive beam to receive the PDCCH sent by the network device.

Case 5: The second reference signal includes a reference signal whose channel quality is the best among reference signals whose channel quality is higher than the first threshold and that are received by the terminal device during the first time period.

In this case, the terminal device may train a new beam after the terminal device sends the link reconfiguration request information. To be specific, after receiving the link reconfiguration request information sent by the terminal device, the network device sends a downlink reference signal; the terminal device measures channel quality of the downlink reference signal sent by the network device, to identify the reference signal whose channel quality is the best; and then the terminal device uses a receive beam of the reference signal whose channel quality is the best to receive the PDCCH sent by the network device. In other words, at this time, the terminal device assumes that a DMRS of the PDCCH and the reference signal meet a QCL relationship. Herein, meeting the QCL relationship means that when the terminal device uses a specific receive beam to receive the reference signal whose channel quality is the best, the terminal device uses the specific receive beam to receive the PDCCH sent by the network device. Herein, a downlink reference signal whose channel quality is the best means a reference signal whose channel quality is the best among a plurality of reference signals whose channel quality is higher than the first threshold and that are measured by the terminal device. In this application, a reference signal with good channel quality and a reference signal with good signal quality may be understood as a same meaning and both mean that channel quality information (for example, a reference signal received power (Reference Signal Received Power, RSRP) or a channel quality indicator (Channel Quality Indicator, CQI)) of the reference signal is higher than a preset threshold.

In this application, a start moment of the first time period is the moment n, an end moment of the first time period is a moment at which the terminal device receives first signaling sent by the network device, and the first signaling is used to indicate QCL information of the PDCCH. The first signaling is QCL information reconfigured by the network device for the terminal device after receiving the link reconfiguration request information sent by the terminal device. The first signaling includes at least one of layer-3 signaling (including but not limited to RRC signaling), layer-2 signaling (including but not limited to MAC-CE signaling), and layer-1 signaling (including but not limited to DCI signaling).

Optionally, the first threshold in this application may be configured by the network device or may be predefined.

Optionally, after the end moment of the first time period, that is, after the terminal device receives the PDCCH QCL information reconfigured by the network device, a communication link recovers to normal, the network device sends the PDCCH based on the PDCCH QCL information indicated by the first signaling, and the terminal device detects, based on the PDCCH QCL information reconfigured by the network device, the PDCCH sent by the network device.

Scenario 2: The terminal device receives, during a time period after a link failure occurs and before link communication is recovered to normal, the PDSCH delivered by the network device.

The following describes several cases related to the reference signal that meets the second threshold and that is described in this application:

Case 1: The fourth reference signal includes a downlink reference signal associated with the link reconfiguration request information. The downlink reference signal associated with the link reconfiguration request information means that: Before sending the link reconfiguration request information, the terminal device measures quality of downlink reference signals periodically delivered by the network device, to identify (or select) a downlink reference signal that has good channel quality/signal quality, that is, select a downlink beam (which herein means a transmit beam of the network device) that has good channel quality. Then, the terminal device sends the link reconfiguration request information by using an uplink beam (which herein means a terminal transmit beam) corresponding to the downlink beam that has good channel quality, to ensure transmission reliability of the link reconfiguration request information. The downlink beam and an uplink beam corresponding to the downlink beam are a beam pair in a matching relationship. The beam pair is determined in advance by the network device and the terminal device in a beam training process. The beam pair training process is prior to a process in which the terminal device sends the link reconfiguration request information. The identified (or selected) downlink reference signal that has good channel quality/signal quality is the downlink reference signal associated with the link reconfiguration request information.

In this case, when the terminal device uses a specific transmit beam to send the link reconfiguration request information, the terminal device uses a receive beam corresponding to the specific transmit beam, to receive the PDCCH sent by the network device.

Case 2: The fourth reference signal includes a reference signal whose channel quality is higher than the second threshold and that is received by the terminal device after a link failure occurs and before the link reconfiguration request information is sent.

In this case, the terminal device may identify a new beam after the terminal device detects that a communication link fault (or referred to as a communication link failure, a beam fault, a beam failure, a link fault, a link failure, a communication fault, a communication failure, and the like) occurs on a downlink beam of the network device and before the terminal device sends the link reconfiguration request information. To be specific, the network device periodically sends downlink reference signals; after the terminal device detects that the communication link fault occurs on a downlink beam currently used by the network device for communication, the terminal device measures channel quality of the downlink reference signals sent by the network device, to identify a reference signal whose channel quality is higher than the second threshold; and then the terminal device uses a receive beam of the reference signal whose channel quality is higher than the second threshold, to receive the PDSCH sent by the network device. In other words, at this time, the terminal device assumes that a DMRS of the PDSCH and the reference signal meet a QCL relationship. Herein, meeting the QCL relationship means that when the terminal device uses a specific receive beam to receive the reference signal whose channel quality is higher than the second threshold, the terminal device uses the specific receive beam to receive the PDSCH sent by the network device.

Case 3: The fourth reference signal includes a reference signal whose channel quality is the best among reference signals whose channel quality is higher than the second threshold and that are received by the terminal device after a link failure occurs and before the link reconfiguration request information is sent.

In this case, the terminal device may identify a new beam after the terminal device detects that a communication link fault occurs on a downlink beam of the network device and before the terminal device sends the link reconfiguration request information. To be specific, the network device periodically sends downlink reference signals; after the terminal device detects that the link fault/failure occurs on a downlink beam currently used by the network device for communication, the terminal device measures channel quality of the downlink reference signals sent by the network device, to identify a reference signal whose channel quality is the best; and then the terminal device uses a receive beam of the reference signal whose channel quality is the best to receive the PDSCH sent by the network device. In other words, at this time, the terminal device assumes that a DMRS of the PDSCH and the reference signal meet a QCL relationship. Herein, meeting the QCL relationship means that when the terminal device uses a specific receive beam to receive the reference signal whose channel quality is the best, the terminal device uses the specific receive beam to receive the PDSCH sent by the network device. Herein, a downlink reference signal whose channel quality is the best means a reference signal whose channel quality is the best among a plurality of reference signals whose channel quality is higher than the second threshold and that are measured by the terminal device. In this application, a reference signal with good channel quality and a reference signal with good signal quality may be understood as a same meaning and both mean that channel quality information (for example, a reference signal received power (Reference Signal Received Power, RSRP) or a channel quality indicator (Channel Quality Indicator, CQI)) of the reference signal is higher than a preset threshold.

Case 4: The fourth reference signal includes a reference signal whose channel quality is higher than the second threshold and that is received by the terminal device during the second time period.

In this case, the terminal device may train a new beam during the second time period after the terminal device sends the link reconfiguration request information. To be specific, after receiving the link reconfiguration request information sent by the terminal device, the network device sends a downlink reference signal; the terminal device measures channel quality of the downlink reference signal sent by the network device, to identify the reference signal whose channel quality is higher than the second threshold; and then the terminal device uses a receive beam of the reference signal whose channel quality is higher than the second threshold, to receive the PDSCH sent by the network device. In other words, at this time, the terminal device assumes that a DMRS of the PDSCH and the reference signal meet a QCL relationship. Herein, meeting the QCL relationship means that when the terminal device uses a specific receive beam to receive the reference signal whose channel quality is higher than the second threshold, the terminal device uses the specific receive beam to receive the PDSCH sent by the network device.

Case 5: The fourth reference signal includes a reference signal whose channel quality is the best among reference signals whose channel quality is higher than the second threshold and that are received by the terminal device during the second time period.

In this case, the terminal device may train a new beam during the second time period after the terminal device sends the link reconfiguration request information. To be specific, after receiving the link reconfiguration request information sent by the terminal device, the network device sends a downlink reference signal; the terminal device measures channel quality of the downlink reference signal sent by the network device, to identify the reference signal whose channel quality is the best; and then the terminal device uses a receive beam of the reference signal whose channel quality is the best to receive the PDSCH sent by the network device. In other words, at this time, the terminal device assumes that a DMRS of the PDSCH and the reference signal meet a QCL relationship. Herein, meeting the QCL relationship means that when the terminal device uses a specific receive beam to receive the reference signal whose channel quality is the best, the terminal device uses the specific receive beam to receive the PDSCH sent by the network device. Herein, a downlink reference signal whose channel quality is the best means a reference signal whose channel quality is the best among a plurality of reference signals whose channel quality is higher than the second threshold and that are measured by the terminal device. In this application, a reference signal with good channel quality and a reference signal with good signal quality may be understood as a same meaning and both mean that channel quality information (for example, a reference signal received power (Reference Signal Received Power, RSRP) or a channel quality indicator (Channel Quality Indicator, CQI)) of the reference signal is higher than a preset threshold.

Values of the second threshold and the first threshold in this application may be the same or may be different. This is not limited in this application.

Case 6: The fourth reference signal includes a reference signal that meets a QCL relationship with the PDCCH, or the reference signal meeting the second threshold includes a reference signal received by the terminal device in an initial access process.

In this case, the terminal device receives the PDSCH by using, by default, a receive beam the same as that used to receive the PDCCH. In other words, when the terminal device uses one or more specific receive beams to receive the PDCCH, the terminal device uses the one or more specific receive beams to receive the PDSCH. Alternatively, when the terminal device uses one or more specific receive beams to receive the reference signal in the initial access process, the terminal device uses the one or more specific receive beams to receive the PDSCH. Herein, the reference signal received by the terminal device in the initial access process includes but is not limited to a downlink synchronization signal block (Synchronization Signal block, SS block), and the SS block includes at least one of the following: a secondary synchronization signal (Secondary Synchronization Signal, SSS), a primary synchronization signal (Primary Synchronization Signal, PSS), and a physical broadcast channel (Physical Broadcast Channel, PBCH).

Case 7: The fourth reference signal is indicated by a default state in a transmission configuration indication table (TCI table), and the TCI table is configured by the network device for the terminal device before an end moment of the second time period. The fourth reference signal indicated by the default state includes a reference signal that meets a QCL relationship with the PDCCH, or a reference signal received by the terminal device in an initial access process. This case means that the TCI table sent by the network device includes a default state, and an index value of a TCI state corresponding to the default state may be, for example, 00. The terminal device detects the PDSCH by using a receiving manner indicated by the default state. In this case, the fourth reference signal includes a reference signal that meets a QCL relationship with the PDCCH. In other words, when the terminal device uses one or more specific receive beams to receive the PDCCH, the terminal device uses the one or more specific receive beams to receive the PDSCH. For a specific implementation in which the terminal device uses one or more specific receive beams to receive the PDCCH, refer to the description in step S702. Details are not described herein again. Alternatively, the fourth reference signal includes a reference signal received by the terminal device in an initial access process. In other words, when the terminal device uses one or more specific receive beams to receive the reference signal in the initial access process, the terminal device uses the one or more specific receive beams to receive the PDSCH. Herein, the reference signal received by the terminal device in the initial access process includes but is not limited to a downlink synchronization signal block (Synchronization Signal block, SS block), and the SS block includes at least one of the following: a secondary synchronization signal (Secondary Synchronization Signal, SSS), a primary synchronization signal (Primary Synchronization Signal, PSS), and a physical broadcast channel (Physical Broadcast Channel, PBCH).

Case 8: The method further includes: sending, by the network device, second signaling to the terminal device during the second time period; and receiving, by the terminal device during the second time period, the second signaling sent by the network device. The second signaling includes layer-1 signaling (including but not limited to DCI signaling). The second signaling is used to indicate a transmission configuration indication state TCI state, the TCI state is used to indicate QCL information of the PDSCH, the TCI state is a state in a TCI table, and the TCI table is configured by the network device for the terminal device before an end moment of the second time period. Herein, the TCI table actually means a TCI table corresponding to a dedicated CORESET. In this case, an implementation is as follows: The terminal device detects, based on default QCL information, the PDSCH during the second time period after the moment n. The default QCL information includes the QCL assumption information that is of the fourth reference signal and the third reference signal and that is described in any one of case 1 to case 6 in scenario 2. This implementation means that: Regardless of whether a default state is indicated by a received TCI state, the terminal device automatically interprets the TCI state as the default state, and then detects the PDSCH by using a receiving manner indicated by the default state. Herein, the detecting the PDSCH by using a receiving manner indicated by the default state includes any one PDSCH detection manner in case 1 to case 6 in scenario 2.

Another implementation is as follows: The terminal device assumes, during the second time period after the moment n, that a PDSCH QCL indicated by the TCI state is invalid, and detects the PDSCH based on default QCL information. The default QCL information includes the QCL assumption information that is of the reference signal meeting the second threshold and the third reference signal and that is described in any one of case 1 to case 6 in scenario 2. This implementation means that: If a TCI state received by the terminal device indicates a default state, the terminal device identifies the TCI state as valid, and then detects the PDSCH by using a receiving manner indicated by the default state; or if a TCI state received by the terminal device indicates a state other than a default state, the terminal device determines that the TCI state is invalid, and then detects the PDSCH by using a receiving manner indicated by the default state.

In this application, a start moment of the second time period is the moment n, an end moment of the second time period is a moment at which the terminal device receives third signaling sent by the network device, the third signaling is used to indicate a TCI table of the PDSCH, and the TCI table is used to indicate candidate QCL information of the PDSCH. Herein, the TCI table is a TCI table reconfigured by the network device for the terminal device. Specifically, two types of control resource sets (Control resource set, CORESET) are used in this application: a previous CORESET and a dedicated CORESET. The previous CORESET is corresponding to a control resource set used for data scheduling and allocated by the network device for the terminal device when communication is normal in a beam link previously, and the dedicated CORESET is used for downlink communication after a link failure occurs and is mainly used by the network device to send link reconfiguration response information. The CORESET is explained as follows: To improve efficiency in blind detection performed by the terminal device on a control channel, a concept of CORESET is put forward in a process in which an NR standard is formulated. In other words, one or more control resource sets are divided for each terminal device in a control area. The network device may send a control channel to the terminal device in any one control resource set corresponding to the terminal device. In addition, the network device needs to notify the terminal device of other configurations associated with the control resource set, for example, a search space. In the plurality of control resource sets obtained through division in the control area, control resource sets differ in configuration information, for example, frequency domain widths are different, and time domain lengths are different. The PDSCH TCI table indicated by the third signaling in this application actually means a TCI table in the previous CORESET in which a link fault/a link failure occurs previously. After the network device reconfigures a TCI table for the previous CORESET, it indicates that a previously failed link is recovered to normal again. Herein, the third signaling includes at least one of layer-3 signaling (including but not limited to RRC signaling) and layer-2 signaling (including but not limited to MAC-CE signaling).

In this application, the second threshold may be configured by the network device or may be predefined.

Optionally, the network device sends fourth signaling to the terminal device after the end moment of the second time period, and the terminal device receives the fourth signaling sent by the network device. The fourth signaling is used to indicate a TCI state in the TCI table indicated by the third signaling, and the TCI state is used to indicate QCL information of the PDSCH. In other words, the terminal device receives the PDSCH QCL information reconfigured by the network device. Then, the network device sends the PDSCH based on the PDSCH QCL information indicated by the fourth signaling, and the terminal device detects the PDSCH based on the PDSCH QCL information indicated by the fourth signaling. The fourth signaling includes layer-1 signaling (including but not limited to DCI signaling).

Optionally, the network device sends a first control resource set during the first time period, and the terminal device detects the first control resource set during the first time period. The first control resource set is a resource set configured by the network device for the terminal device and used to send link reconfiguration response information.

Optionally, the network device sends a second control resource set after the end moment of the first time period, and the terminal device detects the second control resource set after the end moment of the first time period. The second control resource set is a resource set (that is, the previous CORESET) in which a link failure occurs. This case means that the network device does not change a time-frequency resource of the second control resource set, but reconfigures QCL for the second control resource set, to recover the second control resource set. In this way, after the first time period expires, the terminal device can properly detect control information transmitted by using the second control resource set. In another implementation, the second control resource set is a resource set reconfigured by the network device. In other words, a resource set in which a link failure occurs is discarded, and a new resource set is configured to transmit control information. Both a time-frequency resource and QCL in the new resource set are different from those in the resource set in which the link failure occurs.

Optionally, the network device sends QCL information of the second control resource set to the terminal device by using the first control resource set, and the terminal device receives the QCL information that is of the second control resource set and that is sent by the network device by using the first control resource set.

Optionally, the QCL information of the second control resource set is the foregoing PDCCH QCL information indicated by the first signaling.

When the method described in the first aspect is performed, during a time period after a link failure occurs and before link communication is recovered to normal, the terminal device can properly receive the PDCCH/PDSCH delivered by the network device, thereby improving link reliability.

According to a third aspect, this application provides a terminal device. The terminal device may include a plurality of function modules or units, configured to correspondingly perform the signal transmission method provided in the first aspect or the signal transmission method provided in any one of the possible implementations of the first aspect.

According to a fourth aspect, this application provides a network device. The network device may include a plurality of function modules or units, configured to correspondingly perform the signal transmission method provided in the second aspect or the signal transmission method provided in any one of the possible implementations of the second aspect.

According to a fifth aspect, this application provides a terminal device, configured to perform the signal transmission method described in the first aspect. The terminal device may include: a memory, a processor coupled with the memory, and a transceiver. The transceiver is configured to communicate with another communications device (such as a network device). The memory is configured to store code for implementing the signal transmission method described in the first aspect. The processor is configured to execute the program code stored in the memory, that is, perform the signal transmission method provided in the first aspect, or the signal transmission method provided in any one of the possible implementations of the first aspect.

According to a sixth aspect, this application provides a network device, configured to perform the signal transmission method described in the second aspect. The network device may include: a memory, a processor coupled with the memory, and a transceiver. The transceiver is configured to communicate with another communications device (such as a terminal device). The memory is configured to store code for implementing the signal transmission method described in the second aspect. The processor is configured to execute the program code stored in the memory, that is, perform the signal transmission method provided in the second aspect, or the signal transmission method provided in any one of the possible implementations of the second aspect.

According to a seventh aspect, a communications system is provided. The communications system includes a terminal device and a network device.

The terminal may be the terminal device described in the third aspect or the fifth aspect, or may be the network device described in the fourth aspect or the sixth aspect.

According to an eighth aspect, a computer readable storage medium is provided. The readable storage medium stores an instruction. When the instruction is run on a computer, the computer performs the signal transmission method described in the first aspect.

According to a ninth aspect, a computer readable storage medium is provided. The readable storage medium stores an instruction. When the instruction is run on a computer, the computer performs the signal transmission method described in the second aspect.

According to a tenth aspect, a computer program product including an instruction is provided. When the computer program product is run on a computer, the computer performs the signal transmission method described in the first aspect.

According to an eleventh aspect, a computer program product including an instruction is provided. When the computer program product is run on a computer, the computer performs the signal transmission method described in the second aspect.

According to a twelfth aspect, this application provides an apparatus. The apparatus may include a processor and one or more interfaces coupled with the processor. The processor may be configured to invoke, from a memory, the signal transmission method provided in the first aspect; or invoke a program for implementing the signal transmission method provided in any one of the possible implementations of the first aspect, and execute an instruction included in the program. The interface may be configured to output a processing result of the processor.

According to a thirteenth aspect, this application provides an apparatus. The apparatus may include a processor and one or more interfaces coupled with the processor. The processor may be configured to invoke, from a memory, the signal transmission method provided in the second aspect; or invoke a program for implementing the signal transmission method provided in any one of the possible implementations of the second aspect, and execute an instruction included in the program. The interface may be configured to output a processing result of the processor.

BRIEF DESCRIPTION OF DRAWINGS

To describe the technical solutions in the embodiments of this application or in the background more clearly, the following briefly describes the accompanying drawings required for describing the embodiments of this application or the background.

DESCRIPTION OF EMBODIMENTS

Terms used in an implementation part of this application are merely used to explain specific embodiments of this application, but are not intended to limit this application.

Figure 1:
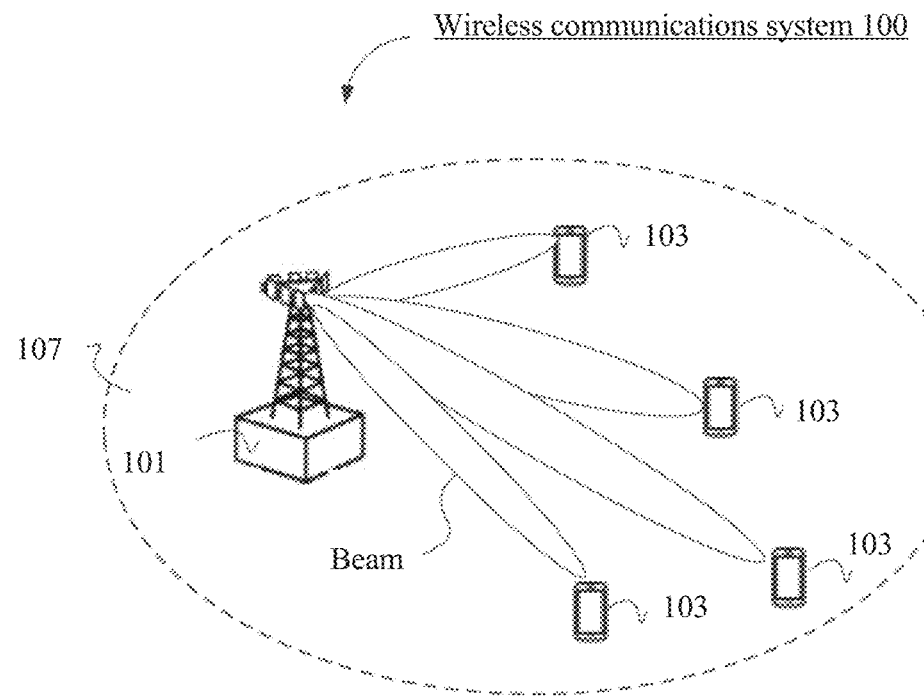
FIG. 1 is a schematic architectural diagram of a wireless communications system according to this application.

FIG. 1 shows a wireless communications system used in this application. The wireless communications system may operate on a high frequency band, and is not limited to a Long Term Evolution (Long Term Evolution, LTE) system, and may be a future evolved 5th-generation (the 5th Generation, 5G) mobile communications system, a new radio (New Radio, NR) system, a machine-to-machine (Machine to Machine, M2M) communications system, or the like. As shown in FIG. 1, the wireless communications system 100 may include: one or more network devices 101, one or more terminals 103, and a core network (not shown).

The network device 101 may be a base station. The base station may be configured to communicate with the one or more terminals, or may be configured to communicate with one or more base stations that have some terminal functions (for example, communication between a macro base station and a micro base station, such as an access point). The base station may be a base transceiver station (Base Transceiver Station, BTS) in a time-division synchronous code division multiple access (Time Division Synchronous Code Division Multiple Access, TD-SCDMA) system, or may be an evolved NodeB (Evolved Node B, eNB) in the LTE system, or a base station in the 5G system or the new radio (NR) system. In addition, the base station may be an access point (Access Point, AP), a transmit-receive point (Transmission Receive Point, TRP), a central unit (Central Unit, CU), or another network entity, and may include some or all of functions of the foregoing network entity.

The terminals 103 may be distributed in the entire wireless communications system 100, may be stationary, or may be mobile. In some embodiments of this application, the terminal 103 may be a mobile device, a mobile station (mobile station), a mobile unit (mobile unit), an M2M terminal, a radio unit, a remote unit, a terminal agent, a mobile client, or the like.

In this application, the wireless communications system 100 is a multi-beam communications system.

The network device 101 may be provided with a large-scale antenna array and control, by using a beamforming technology, the antenna array to form beams in different directions. To cover the entire cell 107, the network device 101 needs to use a plurality of beams in different directions.

For example, in a downlink process, the network device 101 may sequentially use the beams in different directions, to transmit a wireless signal (for example, a downlink reference signal (Reference Signal, RS) and/or a downlink synchronization signal block (Synchronization Signal block, SS block)). This process is referred to as beam scanning (Beam scanning). In addition, the terminal 103 measures a transmit beam and determines signal quality of the transmit beam that can be received by the terminals 103. This process is referred to as beam measurement (Beam measurement).

In a future communications system, the terminal 103 may also be provided with an antenna array or may change different beams to receive and send a signal. In other words, in the wireless communications system 100, both the network device 101 and the terminal 103 may use a plurality of beams to perform communication. In a downlink transmission process, a manner in which the network device 101 sends a PDCCH to the terminal 103 may be shown in FIG. 2A to FIG. 2D.

Figure 2A:
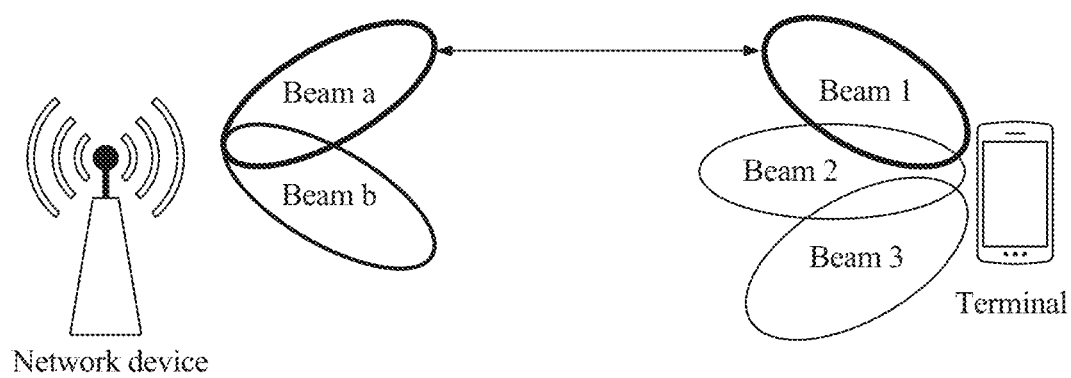
FIG. 2A to FIG. 2D are schematic diagrams of several PDCCH transmission scenarios in a multi-beam network used in this application.

FIG. 2A shows that the network device 101 uses one transmit beam (such as a beam a) to send the PDCCH to the terminal 103, and the terminal 103 uses one receive beam (such as a beam 1) to receive the PDCCH. In a scenario shown in FIG. 2A, the beam a and the beam 1 are paired.

Figure 2B:
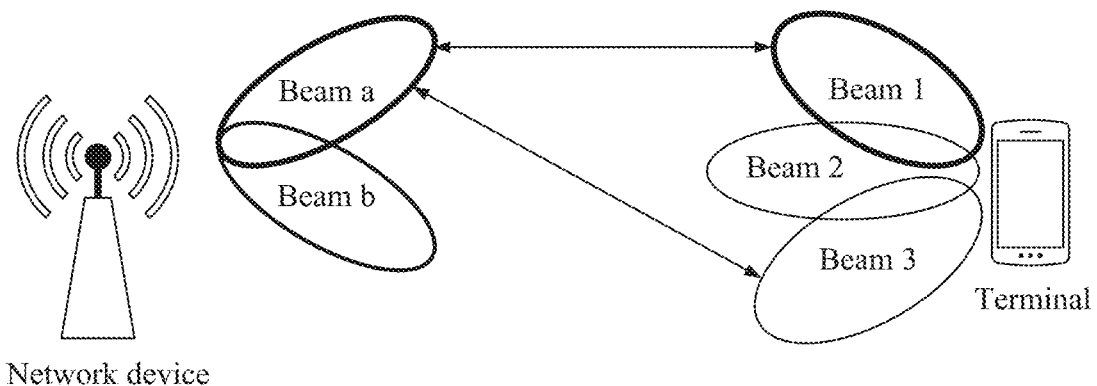

FIG. 2B shows that the network device 101 uses one transmit beam (such as a beam a) to send the PDCCH to the terminal 103, and the terminal 103 uses a plurality of receive beams (such as a beam 1 and a beam 3) to receive the PDCCH. In a scenario shown in FIG. 2B, the beam a and the beam 1 are paired, and the beam a and the beam 3 are paired.

Figure 2C:
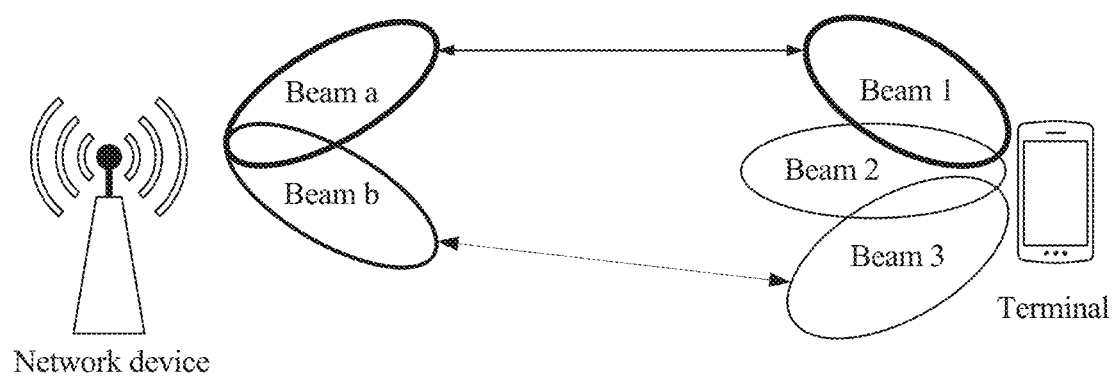

FIG. 2C shows that the network device 101 uses a plurality of transmit beams (such as a beam a and a beam b) to send the PDCCH to the terminal 103, and the terminal 103 uses a plurality of receive beams (such as a beam 1 and a beam 3) to receive the PDCCH. In a scenario shown in FIG. 2C, the beam a and the beam 1 are paired, and the beam b and the beam 3 are paired.

Figure 2D:
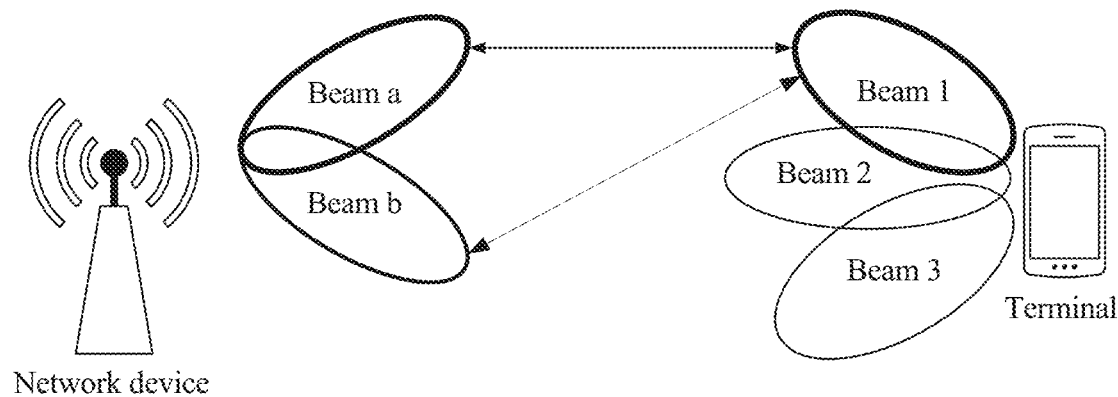

FIG. 2D shows that the network device 101 uses a plurality of transmit beams (such as a beam a and a beam b) to send the PDCCH to the terminal 103, and the terminal 103 uses a same receive beam (such as a beam 1) to receive the PDCCH. In a scenario shown in FIG. 2D, the beam a and the beam 1 are paired, and the beam b and the beam 1 are paired.

Correspondingly, the four PDCCH transmission scenarios shown in FIG. 2A to FIG. 2D are also applicable to a scenario in which the network device 101 sends a PDSCH to the terminal 103. Details are not described herein.

For ease of differential description, transmit and receive beams of the network device may be referred to as base station beams, including a base station transmit beam (or referred to as a base station sending beam) and a base station receive beam. One network device may have a plurality of base station transmit beams and a plurality of base station receive beams. Transmit and receive beams of the terminal device may be referred to as terminal beams, including a terminal transmit beam (or referred to as a terminal sending beam) and a terminal receive beam. One terminal device may have a plurality of terminal transmit beams and a plurality of terminal receive beams.

Figure 3:
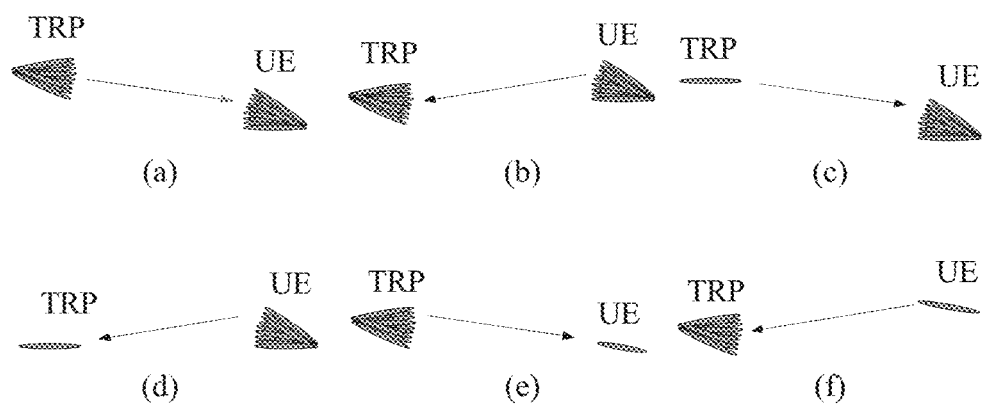
FIG. 3 is a schematic diagram of a beam training process used in this application.

The paired base station transmit beam and terminal receive beam and the paired terminal transmit beam and base station receive beam that are shown in FIG. 2A to FIG. 2D are paired in a beam training process. Referring to FIG. 3, FIG. 3 is a beam training process used in this application. (e) shown in FIG. 3 is a process in which beams sent by the network device are trained. The network device sends a plurality of beams, and the terminal measures the plurality of beams sent by the network device, and notifies the network device of a beam that is relatively optimal among the plurality of beams sent by the network device. On the contrary, (d) shown in FIG. 3 is a process in which beams sent by the terminal are trained. The terminal sends a plurality of beams, and the network device measures the plurality of beams sent by the terminal, and notifies the terminal of a beam that is relatively optimal among the plurality of beams sent by the terminal. Through the beam training process, the network device obtains N beam pairs (Beam Pair Link, BPL) that are relatively optimal in communication with the terminal. In the beam pair BPL <Bx, B'x>, Bx represents a transmit beam of the network device, and B'x represents a receive beam of the terminal. In the beam pair BPL <By, B'y>, By represents a transmit beam of the terminal, and B'y represents a receive beam of the network device. In a subsequent process of communication with the terminal, the network device uses the N BPLs to perform data transmission. The relatively optimal beam mentioned herein means that the beam has relatively high quality as indicated in channel quality information (for example, a reference signal received power (Reference Signal Received Power, RSRP) or a channel quality indicator (Channel Quality Indicator, CQI)).

In this application, each base station receive beam has one corresponding base station transmit beam. Herein, that the base station receive beam is corresponding to the base station transmit beam means having same directivity. Optionally, the base station receive beam and a base station transmit beam corresponding to the base station receive beam may be a same beam and can share a same transceiver apparatus. Optionally, an antenna port corresponding to the base station receive beam and an antenna port corresponding to the corresponding base station transmit beam may meet the quasi co-location (Quasi Co-location, QCL).

In this application, each terminal receive beam has one corresponding terminal transmit beam. Herein, that the terminal receive beam is corresponding to the terminal transmit beam means having same directivity. Optionally, the terminal receive beam and a terminal transmit beam corresponding to the terminal receive beam may be a same beam and can share a same transceiver apparatus. Optionally, an antenna port corresponding to the terminal receive beam and an antenna port corresponding to the corresponding terminal transmit beam may meet QCL.

It should be noted that the beam mentioned in this application may be represented by using a reference signal resource or be represented by using QCL information.

This application relates to a concept of quasi co-location (Quasi Co-location, QCL). The QCL may be used to assist in describing beamforming information and a receiving process of a receiving side of a user. The QCL information may include some spatial feature parameters, for example, parameters related to an angle of departure, such as a horizontal angle of departure (Azimuth angle of Departure, AoD), a vertical angle of departure (Zenith angle of Departure, ZoD), a horizontal angle spread of departure (Azimuth angle spread of Departure, ASD), and a vertical angle spread of departure (Zenith angle spread of Departure, ZSD), or parameters related to an angle of arrival, such as a horizontal angle of arrival (Azimuth angle of Arrival, AoA), a vertical angle of arrival (Zenith angle of Arrival, ZoA), a horizontal angle spread of arrival (Azimuth angle spread of Arrival, ASA), and a vertical angle spread of arrival (Zenith angle spread of Arrival, ZSA). These spatial feature parameters describe features of a spatial channel between antenna ports of reference signals (Reference Signal, RS). The QCL information may also include spatial receive (Receive, RX) parameters. In addition, the QCL information may also include but is not limited to at least one of the following parameters: a delay spread, a Doppler spread, a Doppler frequency shift, an average gain, and an average delay. Optionally, spatial feature parameters included in the QCL may also be parameters other than the foregoing parameters. This is not limited herein. To reduce overheads used by the network device to indicate the QCL to the terminal, in a candidate conventional technology, QCL sent by the network device to the terminal indicates and restricts that: one of M transmit and receive beam pairs that are previously reported by the terminal and that are obtained in measurement performed based on a channel state information reference signal (Channel State Information Reference Signal, CSI-RS) meets a QCL relationship. In other words, a receive beam of a demodulation reference signal (Demodulation Reference Signal, DMRS) for current data is the same as one receive beam in the M transmit and receive beam pairs that are previously reported by the terminal and that are obtained in CSI-RS-based measurement. For example, the terminal measures CSI-RSs of a plurality of beams sent by the network device, to select several relatively optimal beams, for example, four beams, and reports measurement information of the four optimal beams to the network device. The beam measurement information is beam status information (Beam Status Information, BSI), and content mainly includes a reference signal resource index and a reference signal received power (Reference Signal Received Power, RSRP) of a beam. The QCL sent by the network device to the terminal indicates that a third CSI-RS in the four transmit and receive beam pairs that are previously reported by the terminal and that are obtained in CSI-RS-based measurement meets the QCL relationship, and then the terminal uses a receive beam corresponding to the third CSI-RS to receive the PDSCH delivered by the network device.

Through the foregoing beam training process shown in FIG. 3, the network device obtains N beam pairs (Beam Pair Link, BPL) that are relatively optimal in communication with the terminal. In a subsequent process of communication with the terminal, the network device uses the N BPLs to perform data transmission. However, because of blocking in a communication process and a poor diffraction capability on a high-frequency channel, a beam of a current service is blocked, and signal transmission cannot continue. To avoid a case in which the beam is blocked and the communication is interrupted abruptly, a corresponding mechanism needs to be introduced to detect beam quality and quickly recover a link when the beam is blocked.

To quickly recover a link when the beam is blocked, the network device needs to configure, for the terminal, a reference signal resource set used for beam failure detection (beam failure detection RS set) and a reference signal resource set used for recovering a link between the terminal device and the network device (candidate beam identification RS set) (also referred to as a candidate reference signal resource set). An RS in the beam failure detection RS set and a reference signal of the downlink physical control channel PDCCH meet a QCL relationship. When channel quality information (for example, an RSRP or a CQI) of some or all reference signals in the set is lower than a preset threshold, it is determined that a communication link fault occurs. In this application, the communication link fault may also be referred to as a communication link failure, a beam fault, a beam failure, a link fault, a link failure, a communication fault, a communication failure, and the like. In this specification, these concepts have a same meaning. After the communication link fault occurs, the terminal needs to select, from the candidate reference signal set, a reference signal resource whose channel quality information (for example, an RSRP or a CQI) is higher than the preset threshold, to recover a communication link. Herein, the beam failure detection RS set is used by the terminal to detect channel quality of a transmit beam of the network device. The transmit beam is a beam used by the network device when communicating with the terminal. The candidate beam identification RS set is a reference signal set used to initiate link reconfiguration after the terminal determines that a communication link fault occurs on the transmit beam of the network device. In this application, link reconfiguration may also be referred to as recovery of the communication between the network device and the terminal device. In a specific implementation, the reference signal resource set used for beam failure detection and the reference signal resource set used for recovering the link between the terminal device and the network device may also have other names. This is not specifically limited in this application.

The network device notifies the terminal of the QCL relationship of the PDCCH/PDSCH to instruct the terminal to use a specific receive beam to receive the PDCCH/PDSCH. In a current standard, it is agreed to use semi-static signaling including a radio resource control (Radio Resource Control, RRC) control element (Control Element, CE) and/or a Media Access Control (Media Access Control, MAC) control element, to notify the terminal of the QCL relationship of the PDCCH. For the PDSCH, dynamic signaling including downlink physical control information (Downlink Control Information, DCI) and an RRC CE and/or a MAC CE is used to notify the terminal of the QCL relationship (a TCI table) of the PDSCH.

All the communication link faults described in the following embodiments indicate the following scenario: When the network device uses a transmit beam to send signaling and/or data to the terminal device, because the transmit beam is blocked, signal transmission cannot continue, and consequently communication is interrupted and the terminal device cannot properly receive the signaling and/or the data delivered by the network device.

Figure 4:
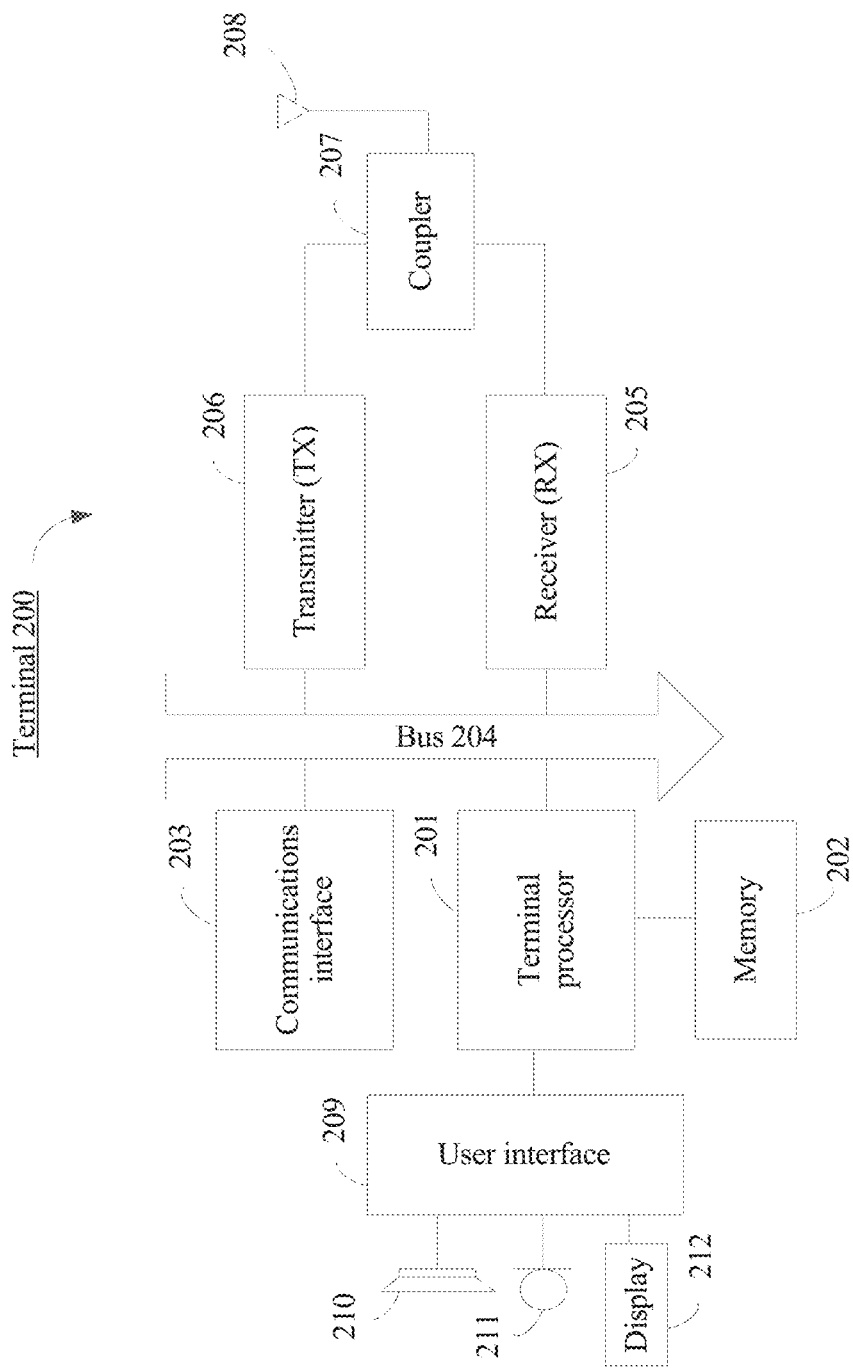
FIG. 4 is a schematic diagram of a hardware architecture of a terminal device according to an embodiment of this application.

Referring to FIG. 4, FIG. 4 shows a terminal 200 provided in some embodiments of this application. As shown in FIG. 4, the terminal 200 may include: one or more terminal processors 201, a memory 202, a communications interface 203, a receiver 205, a transmitter 206, a coupler 207, an antenna 208, a terminal interface 209, and an input/output module (including an audio input/output module 210, a key input module 211, a display 212, and the like). These components may be connected by using a bus 204 or in another manner. In FIG. 4, for example, the components are connected by using the bus.

The communications interface 203 may be used for communication between the terminal 200 and another communications device, for example, a network device. Specifically, the network device may be a network device 300 shown in FIG. 5. Specifically, the communications interface 203 may be a communications interface of Long Term Evolution (LTE) (4G), or may be a communications interface of 5G or the future new radio. The terminal 200 is not limited to a wireless communications interface, and may be provided with a wired communications interface 203, for example, a local access network (Local Access Network, LAN) interface.

The transmitter 206 may be configured to transmit a signal output by the terminal processor 201, for example, perform directional sending through beamforming. The receiver 205 may be configured to receive a mobile communication signal received by the antenna 208, for example, perform directional receiving through beamforming. In some embodiments of this application, a transmitter 205/receiver 206 may include a beamforming controller, configured to multiply a sent signal/received signal by a weight vector W1, . . . , Wm, to control directional transmission/reception of the signal. Base station beam switching mentioned in this application may be implemented by using the beamforming controller in the transmitter 205/receiver 206 to multiply the signal/received signal by a weight vector.

In some embodiments of this application, the transmitter 206 and the receiver 205 may be considered as one wireless modem. The terminal 200 may include one or more transmitters 206 and one or more receivers 205. The antenna 208 may be configured to convert electromagnetic energy in a transmission line into an electromagnetic wave in free space, or convert an electromagnetic wave in free space into electromagnetic energy in a transmission line. The coupler 207 is configured to divide mobile communications signals received by the antenna 208 into a plurality of channels and allocate the mobile communications signals to a plurality of receivers 205.

In addition to the transmitter 206 and the receiver 205 shown in FIG. 4, the terminal 200 may include another communications component, for example, a GPS module, a Bluetooth (Bluetooth) module, or a Wireless Fidelity (Wireless Fidelity, Wi-Fi) module. The terminal 200 is not limited to the foregoing described wireless communications signal, and may support another wireless communications signal, for example, a satellite signal or a short wave signal. The terminal 200 is not limited to wireless communication, and may be provided with a wired network interface (for example, a LAN interface) to support wired communication.

The input/output module may be configured to perform interaction between the terminal 200 and a terminal/an external environment, and may mainly include the audio input/output module 210, the key input module 211, the display 212, and the like. Specifically, the input/output module may also include a camera, a touchscreen, a sensor, and the like. The input/output module communicates with the terminal processor 201 by using the terminal interface 209.

The memory 202 is coupled with the terminal processor 201, and is configured to store various software programs and/or a plurality of groups of instructions. Specifically, the memory 202 may include a high-speed random access memory, and may include a non-volatile memory, for example, one or more magnetic disk storage devices, flash memory devices, or other non-volatile solid-state storage devices. The memory 202 may store an operating system (hereinafter referred to as a system), for example, an embedded operating system such as Android, iOS, Windows, or Linux. The memory 202 may further store a network communication program. The network communication program may be used to communicate with one or more additional devices, one or more terminal devices, and one or more network devices. The memory 202 may further store a terminal interface program. The terminal interface program may vividly display content of an application program by using a graphical operation interface, and receive, by using an input control such as a menu, a dialog box, or a key, a control operation performed by a terminal on an application.

In some embodiments of this application, the memory 202 may be configured to store a program for implementing, on a terminal 200 side, the signal transmission method provided in one or more embodiments of this application. For implementation of the signal transmission method provided in one or more embodiments of this application, refer to subsequent embodiments.

The terminal processor 201 may be configured to read and execute a computer readable instruction. Specifically, the terminal processor 201 may be configured to invoke a program stored in the memory 212, for example, the program for implementing, on the terminal 200 side, the signal transmission method provided in one or more embodiments of this application, and execute an instruction included in the program.

It may be understood that the terminal 200 may be the terminal 103 in the wireless communications system 100 shown in FIG. 1, and may be implemented as a mobile device, a mobile station (mobile station), a mobile unit (mobile unit), a radio unit, a remote unit, a terminal agent, a mobile client, or the like.

It should be noted that the terminal 200 shown in FIG. 4 is merely an implementation of the embodiments of this application. In actual application, the terminal 200 may also include more or fewer components, and this is not limited herein.

Figure 5:
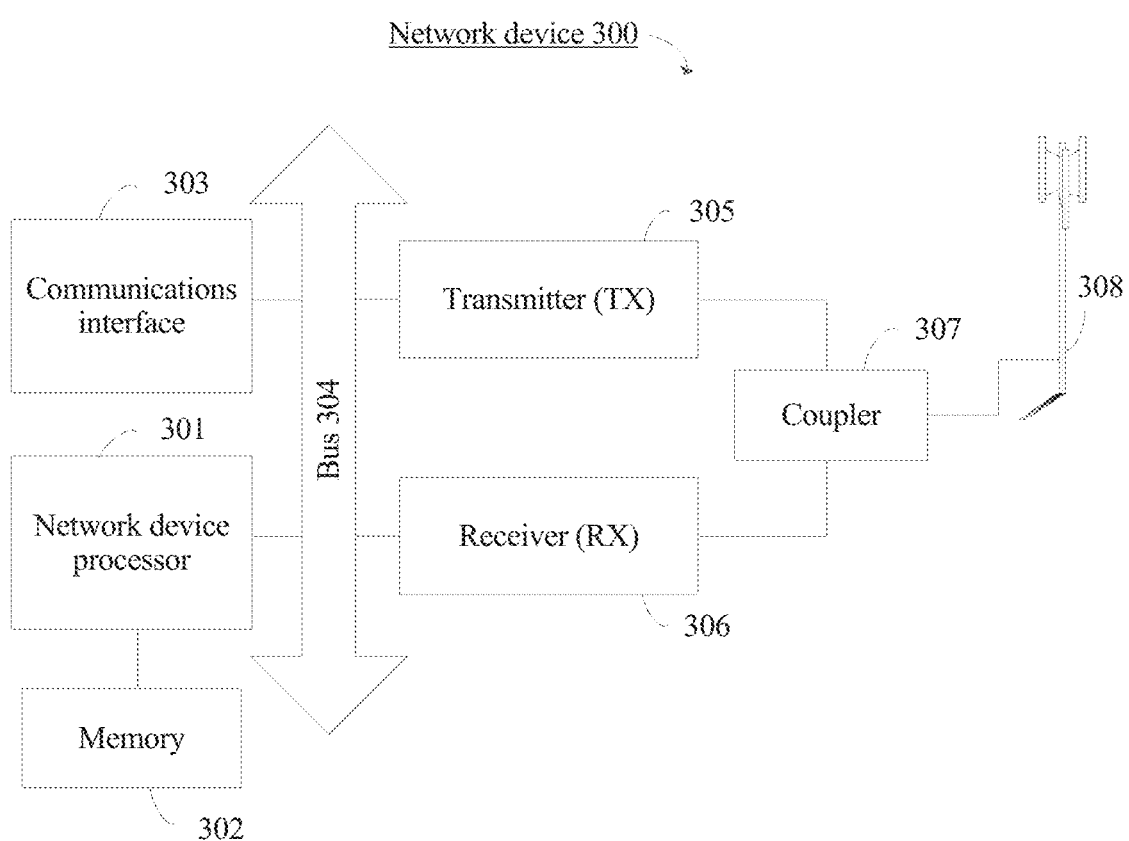
FIG. 5 is a schematic diagram of a hardware architecture of a network device according to an embodiment of this application.

Referring to FIG. 5, FIG. 5 shows a network device 300 provided in some embodiments of this application. As shown in FIG. 5, the network device 300 may include: one or more network device processors 301, a memory 302, a communications interface 303, a transmitter 305, a receiver 306, a coupler 307, and an antenna 308. These components may be connected by using a bus 304 or in another manner. In FIG. 5, for example, the components are connected by using the bus.

The communications interface 303 may be used for communication between the network device 300 and another communications device, for example, a terminal device or another network device. Specifically, the terminal device may be the terminal 200 shown in FIG. 4. Specifically, the communications interface 303 or the communications interface 203 may be a communications interface of Long Term Evolution (LTE) (4G), or may be a communications interface of 5G or the future new radio. The network device 300 is not limited to a wireless communications interface, and may be provided with a wired communications interface 303 to support wired communication. For example, a backhaul connection between a network device 300 and another network device 300 may be wired communication connection.

The transmitter 305 may be configured to transmit a signal output by the network device processor 301, for example, perform directional sending through beamforming. The receiver 306 may be configured to receive a mobile communication signal received by the antenna 308, for example, perform directional receiving through beamforming. In some embodiments of this application, the transmitter 305/receiver 306 may include a beamforming controller, configured to multiply a sent signal/received signal by a weight vector W'1, . . . , W'm, to control directional transmission/reception of the signal. Base station beam switching mentioned in this application may be implemented by using the beamforming controller in the transmitter 305/receiver 306 to multiply the signal/received signal by a weight vector.

In some embodiments of this application, the transmitter 305 and the receiver 306 may be considered as one wireless modem. The network device 300 may include one or more transmitters 305 and one or more receivers 306. The antenna 308 may be configured to convert electromagnetic energy in a transmission line into an electromagnetic wave in free space, or convert an electromagnetic wave in free space into electromagnetic energy in a transmission line. The coupler 307 may be configured to divide mobile communications signals received into a plurality of channels and allocate the mobile communications signals to a plurality of receivers 306.

The memory 302 is coupled with the network device processor 301, and is configured to store various software programs and/or a plurality of groups of instructions. Specifically, the memory 302 may include a high-speed random access memory, and may include a non-volatile memory, for example, one or more disk storage devices, flash memory devices, or other non-volatile solid-state storage devices. The memory 302 may store an operating system (hereinafter referred to as a system), for example, an embedded operating system such as uCOS, VxWorks, or RTLinux. The memory 302 may further store a network communication program. The network communication program may be used to communicate with one or more additional devices, one or more terminal devices, and one or more network devices.

The network device processor 301 may be configured to manage a radio channel, establish and disconnect a call and communication link, provide cell handover control for a terminal in a local control area, and the like. Specifically, the network device processor 301 may include: an administration module/communication module (Administration Module/Communication Module, AM/CM) (used as a center for speech channel switching and information exchange), a basic module (Basic Module, BM) (configured to complete call processing, signaling processing, radio resource management, and circuit maintenance functions), a transcoder and submultiplexer (Transcoder and SubMultiplexer, TCSM) unit (configured to complete multiplexing, demultiplexing, and transcoding functions), and the like.

In this embodiment of this application, the network device processor 301 may be configured to read and execute a computer readable instruction. Specifically, the network device processor 301 may be configured to invoke a program stored in the memory 302, for example, the program for implementing, on the network device 300 side, the signal transmission method provided in one or more embodiments of this application, and execute an instruction included in the program.

It may be understood that the network device 300 may be the network device 101 in the wireless communications system 100 shown in FIG. 1, and may be implemented as a base transceiver station, a wireless transceiver, a basic service set (BSS), an extended service set (ESS), a NodeB, an eNodeB, an access point, a TRP, or the like.

It should be noted that the network device 300 shown in FIG. 5 is merely an implementation of the embodiments of this application. In actual application, the network device 300 may also include more or fewer components, and this is not limited herein.

Figure 6:
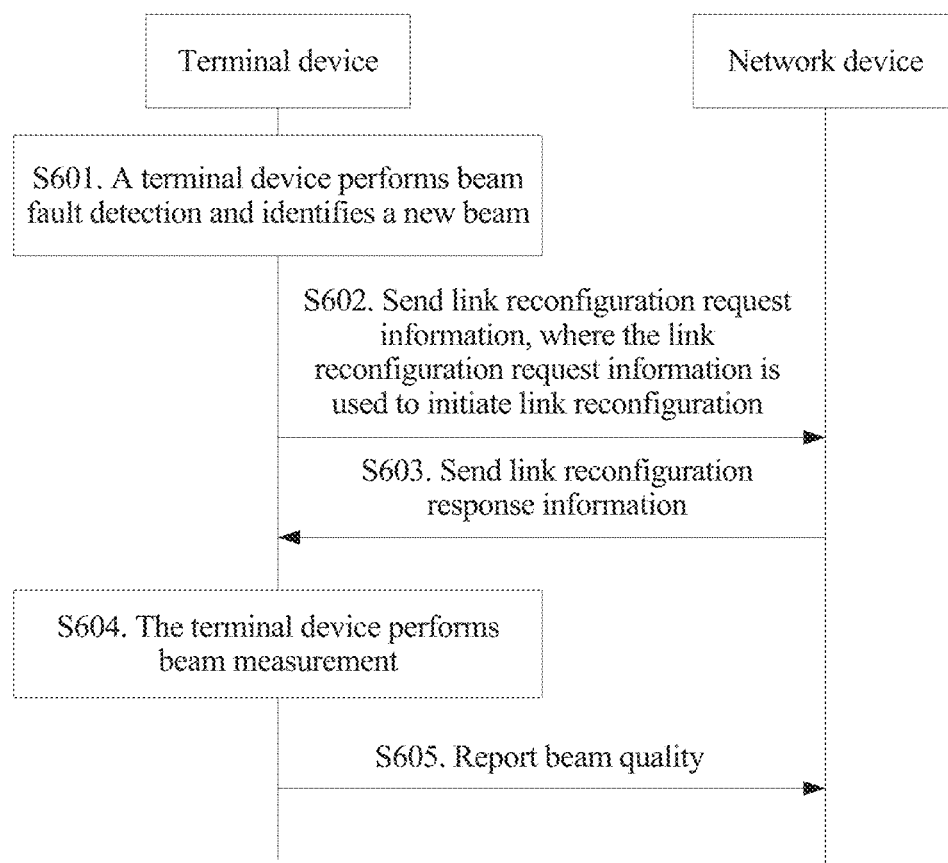
FIG. 6 is a schematic diagram of a beam fault detection and link recovery process according to this application.

Based on the embodiments corresponding to the wireless communications system 100, the terminal 200, and the network device 300, an embodiment of this application provides a beam fault detection and link recovery process. Referring to FIG. 6, FIG. 6 is a schematic diagram of a beam fault detection and link recovery process according to this application. As shown in FIG. 6, the method includes the following steps.

S601. A terminal device performs beam fault detection and identifies a new beam.

Identification of the new beam identification described in this application means that: After a communication link fault occurs, the terminal needs to select, from a candidate reference signal set, a reference signal resource whose channel quality information (for example, an RSRP or a CQI) is higher than a preset threshold, to recover a communication link.

Specifically, the terminal detects that signal quality of a downlink reference signal sent by a network device by using a transmit beam deteriorates, and this indicates that a communication link fault occurs in the transmit beam of the network device. Herein, the transmit beam is a transmit beam used by the network device to communicate with the terminal device. Causes for occurrence of the communication link fault in the transmit beam of the network device include but are not limited to the following: Because of blocking by a barrier in a communication process and a poor diffraction capability on a high-frequency channel, a beam of a current service is blocked, and signal transmission cannot continue. That the signal quality deteriorates may be that channel quality information (for example, an RSRP or a CQI) is lower than a preset threshold.

After the link fault occurs, the terminal continues to detect downlink reference signals delivered by the network device, measures signal quality of the downlink reference signals, to identify (or select) a downlink reference signal that has good channel/signal quality. The identifying a downlink reference signal that has good channel/signal quality means identifying a base station transmit beam that has good channel quality. The base station transmit beam that has good channel quality means that: Channel quality information (for example, an RSRP or a CQI) of the base station transmit beam is higher than the preset threshold; or the terminal successively measures channel quality of a plurality of base station transmit beams, and channel quality of a specific base station transmit beam is the best among the plurality of beams. In this case, the base station transmit beam with the best channel quality is the identified base station transmit beam that has good channel quality. Herein, the network device may use a plurality of transmit beams to separately send the downlink reference signals. In this case, the terminal measures channel quality of the plurality of transmit beams based on the downlink reference signals respectively sent by the network device by using the plurality of transmit beams, to select a base station transmit beam that has good channel quality. In this application, a beam with good channel quality and a downlink reference signal with good channel/signal quality have equivalent meanings.

It may be understood that because the selected base station transmit beam has good quality, it indicates that a terminal receive beam corresponding to the base station transmit beam also has good quality. Likewise, it also indicates that a terminal transmit beam corresponding to the terminal receive beam also has good quality.

S602. The terminal device sends link reconfiguration request information to a network device, where the sent link reconfiguration request information is used to initiate link reconfiguration.

That the link reconfiguration request information is used to initiate link reconfiguration means that the link reconfiguration request information is used to indicate a link failure or a communication failure.

Herein, the terminal device identifies the base station transmit beam that has good quality in step S601, and a terminal receive beam corresponding to the base station transmit beam with good quality also has good quality. Therefore, a terminal transmit beam corresponding to the terminal receive beam with good quality also has good quality. The terminal sends the link reconfiguration request information by using the terminal transmit beam that has good quality.

In this application, the base station transmit beam is corresponding to a terminal receive beam. Each receive beam of the terminal is corresponding to one transmit beam of the terminal. Herein, that the terminal receive beam is corresponding to the terminal transmit beam means having same directivity. Optionally, the terminal receive beam and a terminal transmit beam corresponding to the terminal receive beam may be a same beam and can share a same transceiver apparatus. Optionally, an antenna port corresponding to the terminal receive beam and an antenna port corresponding to the corresponding terminal transmit beam may be quasi co-locationed (QCL). Optionally, the quasi co-location means that at least one of the following parameters is the same or has a determined correspondence: an angle of arrival AoA (angle of arrival), a dominant angle of arrival Dominant AoA, an average angle of arrival, a power angular spectrum of an angle of arrival (power angular spectrum (PAS) of AoA), an angle of departure AoD (angle of departure), a dominant angle of departure, an average angle of departure, a power angular spectrum of an angle of departure, terminal transmit beamforming, terminal receive beamforming, spatial channel correlation, base station transmit beamforming, base station receive beamforming, an average channel gain, an average channel delay, a delay spread delay spread, a Doppler spread Doppler spread, and the like.

S603. The network device receives the link reconfiguration request information of the terminal device, and the network device sends link reconfiguration response information to the terminal.

S604. The terminal device receives the link reconfiguration response information sent by the network device, and the terminal device performs beam measurement.

Specifically, the terminal device receives the downlink reference signals sent by the network device by using different transmit beams, to measure channel quality of the different transmit beams.

S605. The terminal device reports beam quality, and the network device receives the beam quality reported by the terminal device.

The terminal device measures channel quality of a plurality of base station transmit beams, and selects M relatively optimal base station transmit beams to report the beam channel quality. Herein, the base station transmit beam that has relatively optimal channel quality means that: Channel quality information (for example, an RSRP or a CQI) of the base station transmit beam is higher than the preset threshold; or the terminal device successively measures channel quality of a plurality of base station transmit beams, and channel quality of a specific base station transmit beam is the best among the plurality of base station transmit beams. In this case, the base station transmit beam with the best channel quality is the identified base station transmit beam that has good channel quality.

This application focuses on how the terminal device receives/detects a PDCCH/PDSCH during a time period after a link failure/link fault occurs in a transmit beam of the network device and before the terminal device receives QCL information reconfigured by the network device. Herein, the transmit beam of the network device means a base station transmit beam used by a current network device to communicate with the terminal device. That a link failure/link fault occurs in a beam means that the terminal device detects that channel quality information (for example, an RSRP or a CQI) of a downlink reference signal sent by the base station transmit beam is lower than a preset threshold.

After receiving the beam channel quality reported by the terminal device, the network device may reconfigure, for the terminal device, QCL information used to detect the PDCCH/PDSCH. In other words, the network device re-instructs the terminal device to use a specific receive beam to receive the PDCCH/PDSCH.

Based on the embodiments corresponding to the wireless communications system 100, the terminal 200, and the network device 300, an embodiment of this application provides an information indication method. The following separately illustrates, with reference to FIG. 7 and FIG. 8, an information indication method of this application from the perspective of two physical downlink channels: a PDCCH and a PDSCH.

Figure 7:
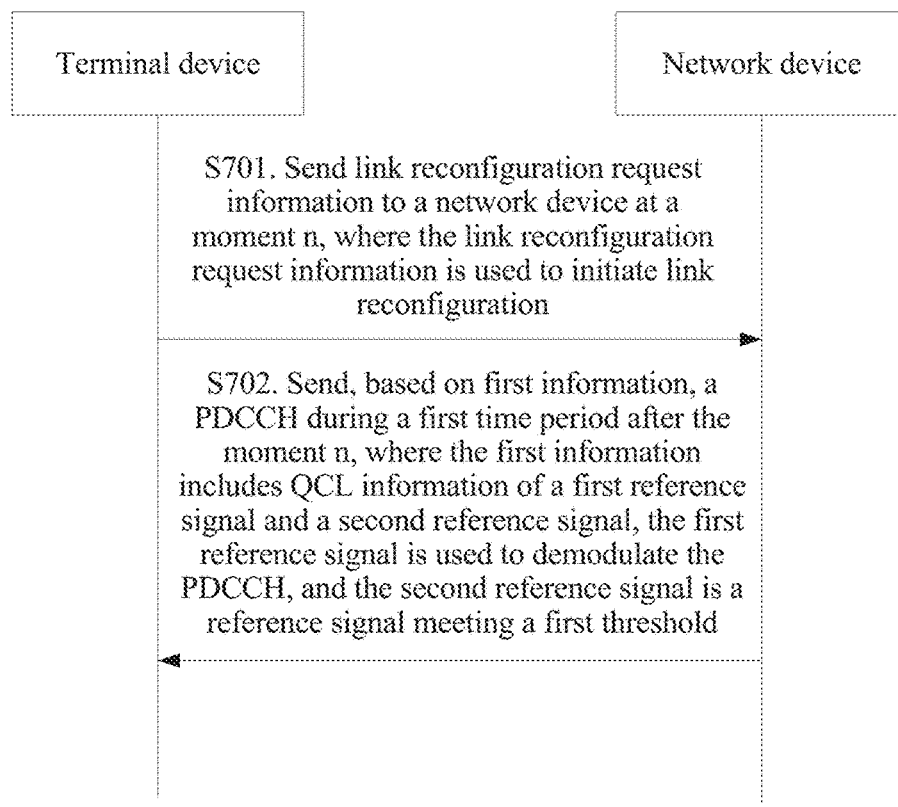
FIG. 7 is a schematic flowchart of an information indication method according to this application.

Referring to FIG. 7, FIG. 7 is a schematic flowchart of an information indication method according to this application. The method focuses on how a terminal device receives/detects a PDCCH sent by a network device during a time period after a link failure/link fault occurs in a downlink beam of the network device and before the terminal device receives QCL information reconfigured by the network device. As shown in FIG. 7, the method includes the following steps.

S701. The terminal device sends link reconfiguration request information to the network device at a moment n, and the network device receives the link reconfiguration request information sent by the terminal device at the moment n, where the link reconfiguration request information is used to initiate link reconfiguration.

In this application, after detecting a link failure, the terminal device sends the link reconfiguration request information to the network device to indicate the beam link failure or a communication failure to the network device. The link failure means that a communication failure occurs when quality of a beam used by the network device to send a physical downlink control channel PDCCH and quality of a beam used to receive the PDCCH deteriorate to a specific level. In other words, the communication failure occurs when quality of a beam pair (Beam Pair Link, BPL) sending and receiving the PDCCH deteriorates to a very low level. Alternatively, when all reference signals meeting a QCL relationship with the PDCCH are lower than a preset threshold, it is determined that a link failure occurs.

Herein, the terminal device identifies the base station transmit beam that has good quality (it is assumed that this beam is a beam b in FIG. 2A to FIG. 2D) in step S601, and a terminal receive beam (it is assumed that this beam is a beam 2 in FIG. 2A to FIG. 2D) corresponding to the base station transmit beam with good quality also has good quality. Therefore, a terminal transmit beam (it is assumed that the terminal receive beam and a terminal transmit beam corresponding to the terminal receive beam are a same beam, and therefore the terminal transmit beam is also the beam 2) corresponding to the terminal receive beam with good quality (the beam 2) also has good quality. The terminal sends the link reconfiguration request information by using the terminal transmit beam (the beam 2) that has good quality.

That the terminal device identifies the base station transmit beam that has good quality means that the terminal device identifies a downlink reference signal (or a downlink reference signal resource) that has good signal quality.

The terminal device sends the link reconfiguration request information by using the terminal transmit beam corresponding to the identified terminal receive beam that has good quality. In this case, downlink beam information (including but not limited to a reference signal resource index and/or channel quality of a reference signal resource) may be implicitly or explicitly fed back to the network device. When a physical random access channel (Physical Random Access Channel, PRACH) resource is used for feedback, the network device may be implicitly notified of the downlink beam information. Because the PRACH resource and a downlink reference signal are in a correspondence (association) relationship, the network device can identify a specific PRACH resource that receives a request, to learn of a downlink reference signal resource identified by the terminal. When a PUCCH resource is used for feedback, the network device may be explicitly notified of the reference signal resource index. When there is reciprocity between an uplink beam and a downlink beam, the terminal may send the link reconfiguration request information by using the terminal transmit beam corresponding to the identified terminal receive beam that has good quality. When there is no reciprocity between an uplink beam and a downlink beam, although a downlink link (that is, a base station transmit beam) of the network device fails, a link failure may not occur in the uplink, and the terminal may continue to use a previous uplink beam to send a beam failure recovery request, or send the link reconfiguration request information through beam scanning, that is, send the link reconfiguration request information by using a plurality of uplink beams. This is not limited in the present invention. In this application, a beam has good quality means that signal quality of a reference signal corresponding to the beam is higher than a preset threshold.

S702. The network device sends, based on first information, a PDCCH during a first time period after the moment n, and the terminal device detects, based on the first information, the PDCCH during the first time period after the moment n, where the first information includes QCL information of a first reference signal and a second reference signal, the first reference signal is used to demodulate the PDCCH, and the second reference signal is a reference signal meeting a first threshold.

In this application, that the terminal device detects a PDCCH based on first information means that when the terminal device uses one or more specific receive beams to receive the second reference signal, the terminal device uses the one or more specific receive beams to receive the PDCCH. In other words, the PDCCH and the second reference signal meet a QCL relationship, or a DMRS of the PDCCH and the second reference signal meet a QCL relationship. To be specific, the PDCCH is received by using a spatial receive parameter (Spatial Rx parameter) the same as that of the second reference signal.

Herein, a start moment of the first time period is the moment n, an end moment of the first time period is a moment at which the terminal device receives first signaling sent by the network device, and the first signaling is used to indicate QCL information of the PDCCH. The first signaling is QCL information reconfigured by the network device for the terminal device after receiving the link reconfiguration request information sent by the terminal device. The first signaling includes at least one of layer-3 signaling (including but not limited to RRC signaling), layer-2 signaling (including but not limited to MAC-CE signaling), and layer-1 signaling (including but not limited to DCI signaling).

In this application, the second reference signal includes a downlink reference signal associated with the link reconfiguration request information. The downlink reference signal associated with the link reconfiguration request information means the downlink reference signal that has good channel quality and that is identified by the terminal device in step S601. In this case, when the terminal device uses one or more specific terminal transmit beams (for example, the beam 2) to send the link reconfiguration request information, the terminal device uses one or more terminal receive beams (the beam 2) that are corresponding to the one or more specific terminal transmit beams (the beam 2) to receive the PDCCH.

In this application, the second reference signal includes a reference signal whose channel quality is higher than the first threshold and that is received by the terminal device after a link failure occurs and before the link reconfiguration request information is sent.

Alternatively, the second reference signal includes a reference signal whose channel quality is the best among reference signals whose channel quality is higher than the first threshold and that are received by the terminal device after a link failure occurs and before the link reconfiguration request information is sent.

In these two cases, the terminal device may identify a new beam after the terminal device detects that a link failure occurs on a downlink beam of the network device and before the terminal device sends the link reconfiguration request information. For example, the network device periodically sends downlink reference signals; after the terminal device detects that the link fault/failure occurs on a downlink beam currently used by the network device for communication, the terminal device measures channel quality of the downlink reference signals sent by the network device, to identify a reference signal whose channel quality is higher than the first threshold; and then the terminal device uses a receive beam of the reference signal whose channel quality is higher than the first threshold, to receive the PDCCH sent by the network device. In other words, at this time, the terminal device assumes that a DMRS of the PDCCH and the reference signal meet a QCL relationship. Herein, meeting the QCL relationship means that when the terminal device uses a specific receive beam (for example, the beam 2) to receive the reference signal whose channel quality is higher than the first threshold, the terminal device uses the specific receive beam (the beam 2) to receive the PDCCH sent by the network device. Alternatively, after the terminal device detects that a link fault/failure occurs on a downlink beam currently used by the network device for communication, the terminal device measures channel quality of downlink reference signals sent by the network device, to identify a reference signal whose channel quality is the best among reference signals whose channel quality is higher than the first threshold; and then the terminal device uses a receive beam of the reference signal whose channel quality is the best to receive the PDCCH sent by the network device. In other words, at this time, the terminal device assumes that a DMRS of the PDCCH and the reference signal meet a QCL relationship. Herein, meeting the QCL relationship means that when the terminal device uses a specific receive beam (for example, the beam 2) to receive the reference signal whose channel quality is the best, the terminal device uses the specific receive beam (the beam 2) to receive the PDCCH sent by the network device. Herein, a downlink reference signal whose channel quality is the best means a reference signal whose channel quality is the best among a plurality of reference signals whose channel quality is higher than the first threshold and that are measured by the terminal device.

Alternatively, the foregoing second reference signal includes a reference signal whose channel quality is higher than the first threshold and that is received by the terminal device during the first time period.

Alternatively, the foregoing second reference signal includes a reference signal whose channel quality is the best among reference signals whose channel quality is higher than the first threshold and that are received by the terminal device during the first time period.

In these two cases, the terminal device may train a new beam after the terminal device sends the link reconfiguration request information. To be specific, after receiving the link reconfiguration request information sent by the terminal device, the network device sends a downlink reference signal; the terminal device measures channel quality of the downlink reference signal sent by the network device, to identify the reference signal whose channel quality is higher than the first threshold; and then the terminal device uses a receive beam of the reference signal whose channel quality is higher than the first threshold, to receive the PDCCH sent by the network device. In other words, at this time, the terminal device assumes that a DMRS of the PDCCH and the reference signal meet a QCL relationship. Herein, meeting the QCL relationship means that when the terminal device uses a specific receive beam (for example, the beam 2) to receive the reference signal whose channel quality is higher than the first threshold, the terminal device uses the specific receive beam (the beam 2) to receive the PDCCH sent by the network device. Alternatively, the terminal device measures channel quality of downlink reference signals sent by the network device, to identify the reference signal whose channel quality is the best; and then the terminal device uses a receive beam of the reference signal whose channel quality is the best to receive the PDCCH sent by the network device. In other words, at this time, the terminal device assumes that a DMRS of the PDCCH and the reference signal meet a QCL relationship. Herein, meeting the QCL relationship means that when the terminal device uses a specific receive beam (for example, the beam 2) to receive the reference signal whose channel quality is the best, the terminal device uses the specific receive beam (the beam 2) to receive the PDCCH sent by the network device. Herein, a downlink reference signal whose channel quality is the best means a reference signal whose channel quality is the best among a plurality of downlink reference signals measured by the terminal device.

In this application, the first threshold may be configured by a network or be predefined.

Optionally, after the end moment of the first time period, that is, after the terminal device receives the PDCCH QCL information reconfigured by the network device, the terminal device detects, based on the PDCCH QCL information reconfigured by the network device, a PDCCH sent by the network device.

Figure 8:
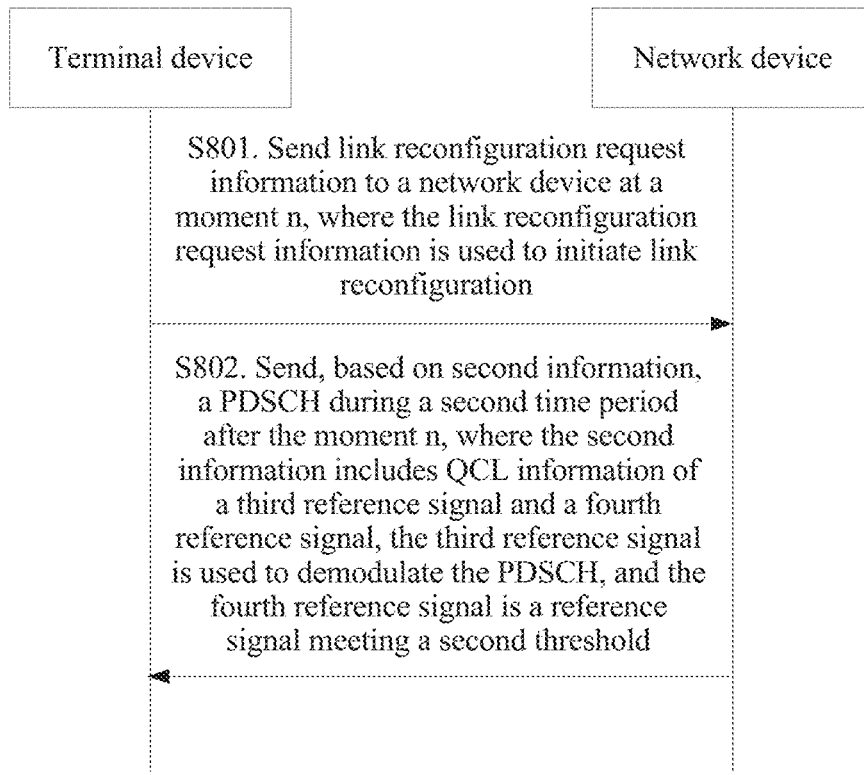
FIG. 8 is a schematic flowchart of another information indication method according to this application.

Referring to FIG. 8, FIG. 8 is a schematic flowchart of another information indication method according to this application. The method focuses on how a terminal device receives/detects a PDSCH sent by a network device during a time period after a link failure/link fault occurs in a downlink beam of the network device and before the terminal device receives QCL information reconfigured by the network device. As shown in FIG. 8, the method includes the following steps.

S801. The terminal device sends link reconfiguration request information to the network device at a moment n, and the network device receives the link reconfiguration request information sent by the terminal device at the moment n, where the link reconfiguration request information is used to initiate link reconfiguration.

For description related to step S801 in this application, refer to the description in step S701. Details are not described herein again.

S802. The network device sends, based on second information, a PDCCH during a second time period after the moment n, and the terminal device detects, based on the second information, the PDSCH during the second time period after the moment n, where the second information includes QCL information of a third reference signal and a fourth reference signal, the third reference signal is used to demodulate the PDSCH, and the fourth reference signal is a reference signal meeting a second threshold.

In this application, that the terminal device detects a PDSCH based on second information means that when the terminal device uses one or more specific receive beams to receive the fourth reference signal, the terminal device uses the one or more specific receive beams to receive the PDSCH. In other words, the PDSCH and the fourth reference signal meet a QCL relationship, or a DMRS of the PDCCH and the fourth reference signal meet a QCL relationship. To be specific, the PDSCH is received by using a spatial receive parameter (Spatial Rx parameter) the same as that of the fourth reference signal.

Herein, a start moment of the second time period is the moment n, an end moment of the second time period is a moment at which the terminal device receives third signaling sent by the network device, the third signaling is used to indicate a TCI table of the PDSCH, and the TCI table is used to indicate candidate QCL information of the PDSCH. Herein, the TCI table is a TCI table reconfigured by the network device for the terminal device. Specifically, two types of control resource sets (Control resource set, CORE-SET) are used in this application: a previous CORESET and a dedicated CORESET. The previous CORESET is corresponding to a control resource set used for data scheduling and allocated by the network device for the terminal device when communication is normal in a beam link previously, and the dedicated CORESET is used for downlink communication after a link failure occurs and is mainly used by the network device to send link reconfiguration response information. The CORESET is explained as follows: To improve efficiency in blind detection performed by the terminal device on a control channel, a concept of CORESET is put forward in a process in which an NR standard is formulated. In other words, one or more control resource sets are divided for each terminal device in a control area. The network device may send a control channel to the terminal device in any one control resource set corresponding to the terminal device. In addition, the network device needs to notify the terminal device of other configurations associated with the control resource set, for example, a search space. In the plurality of control resource sets obtained through division in the control area, control resource sets differ in configuration information, for example, frequency domain widths are different, and time domain lengths are different. The PDSCH TCI table indicated by the third signaling in this application actually means a TCI table in the previous CORESET in which a link fault/a link failure occurs previously. After the network device reconfigures a TCI table for the previous CORESET, it indicates that a previously failed link is recovered to normal again.

Herein, the third signaling includes at least one of layer-3 signaling (including but not limited to RRC signaling) and layer-2 signaling (including but not limited to MAC-CE signaling).

In this application, the foregoing fourth reference signal includes a downlink reference signal associated with the link reconfiguration request information. The downlink reference signal associated with the link reconfiguration request information means the downlink reference signal that has good channel quality and that is identified by the terminal device in step S601. In this case, when the terminal device uses one or more specific transmit beams (for example, the beam 2) to send the link reconfiguration request information, the terminal device uses one or more receive beams (the beam 2) that are corresponding to the one or more specific transmit beams (the beam 2) to receive the PDSCH.

In this application, the foregoing fourth reference signal includes a reference signal whose channel quality is higher than the second threshold and that is received by the terminal device after a link failure occurs and before the link reconfiguration request information is sent.

Alternatively, the foregoing fourth reference signal includes a reference signal whose channel quality is the best among reference signals whose channel quality is higher than the second threshold and that are received by the terminal device after a link failure occurs and before the link reconfiguration request information is sent.

In these two cases, the terminal device may identify a new beam after the terminal device detects that a link failure occurs on a downlink beam of the network device and before the terminal device sends the link reconfiguration request information. To be specific, the network device periodically sends downlink reference signals; after the terminal device detects that the link fault/failure occurs on a downlink beam currently used by the network device for communication, the terminal device measures channel quality of the downlink reference signals sent by the network device, to identify a reference signal whose channel quality is higher than the second threshold; and then the terminal device uses a receive beam of the reference signal whose channel quality is higher than the second threshold, to receive the PDSCH sent by the network device. In other words, at this time, the terminal device assumes that a DMRS of the PDSCH and the reference signal meet a QCL relationship. Herein, meeting the QCL relationship means that when the terminal device uses a specific receive beam (for example, the beam 2) to receive the reference signal whose channel quality is higher than the second threshold, the terminal device uses the specific receive beam (the beam 2) to receive the PDSCH sent by the network device. Alternatively, after the terminal device detects that a link fault/failure occurs on a downlink beam currently used by the network device for communication, the terminal device measures channel quality of downlink reference signals sent by the network device, to identify a reference signal whose channel quality is the best among reference signals whose channel quality is higher than the second threshold; and then the terminal device uses a receive beam of the reference signal whose channel quality is the best to receive the PDSCH sent by the network device. In other words, at this time, the terminal device assumes that a DMRS of the PDSCH and the reference signal meet a QCL relationship. Herein, meeting the QCL relationship means that when the terminal device uses a specific receive beam (for example, the beam 2) to receive the reference signal whose channel quality is the best, the terminal device uses the specific receive beam (the beam 2) to receive the PDSCH sent by the network device. Herein, a downlink reference signal whose channel quality is the best means a reference signal whose channel quality is the best among a plurality of downlink reference signals measured by the terminal device. The second threshold and the foregoing first threshold may be the same or may be different.

Alternatively, the foregoing fourth reference signal includes a reference signal whose channel quality is higher than the second threshold and that is received by the terminal device during the second time period.

Alternatively, the foregoing fourth reference signal includes a reference signal whose channel quality is the best among reference signals whose channel quality is higher than the second threshold and that are received by the terminal device during the second time period.

In these two cases, the terminal device may train a new beam during the second time period after the terminal device sends the link reconfiguration request information. To be specific, after receiving the link reconfiguration request information sent by the terminal device, the network device sends a downlink reference signal; the terminal device measures channel quality of the downlink reference signal sent by the network device, to identify the reference signal whose channel quality is higher than the second threshold; and then the terminal device uses a receive beam of the reference signal whose channel quality is higher than the second threshold, to receive the PDSCH sent by the network device. In other words, at this time, the terminal device assumes that a DMRS of the PDSCH and the reference signal meet a QCL relationship. Herein, meeting the QCL relationship means that when the terminal device uses a specific receive beam (for example, the beam 2) to receive the reference signal whose channel quality is higher than the second threshold, the terminal device uses the specific receive beam (the beam 2) to receive the PDSCH sent by the network device. Alternatively, the terminal device measures channel quality of downlink reference signals sent by the network device, to identify a reference signal whose channel quality is the best among reference signals whose channel quality is higher than the second threshold; and then the terminal device uses a receive beam of the reference signal whose channel quality is the best to receive the PDSCH sent by the network device. In other words, at this time, the terminal device assumes that a DMRS of the PDSCH and the reference signal meet a QCL relationship. Herein, meeting the QCL relationship means that when the terminal device uses a specific receive beam (for example, the beam 2) to receive the reference signal whose channel quality is the best, the terminal device uses the specific receive beam (the beam 2) to receive the PDSCH sent by the network device. Herein, a downlink reference signal whose channel quality is the best means a reference signal whose channel quality is the best among a plurality of downlink reference signals measured by the terminal device. The second threshold and the foregoing first threshold may be the same or may be different.

Optionally, after the end moment of the second time period, that is, after the terminal device receives the PDSCH QCL information reconfigured by the network device, the terminal device detects, based on the PDSCH QCL information reconfigured by the network device, a PDSCH sent by the network device. Herein, the reconfigured QCL means QCL information reconfigured by the network device for a previous CORESET in which a link fault/link failure occurs previously. Specifically, the PDSCH QCL information reconfigured by the network device is indicated by a TCI state. After receiving the link reconfiguration request information sent by the terminal device, the network device sends a TCI table to the terminal device. The TCI table may be sent by using RRC signaling, or may be sent by using MAC CE signaling. The TCI table is used to indicate a plurality of pieces of candidate QCL information that are of the PDSCH and that are configured by the network device for the terminal. Then, the network device dynamically sends the TCI state to the terminal device, where the TCI state is used to indicate QCL information of the PDSCH, and the TCI state is a state in the TCI table. When receiving the TCI state sent by the network device, the terminal device detects, based on the PDSCH QCL information indicated by the TCI state, a PDSCH sent by the network device. Herein, that the terminal device detects, based on the PDSCH QCL information, a PDSCH sent by the network device means that the network device instructs the terminal device to use a specific receive beam to detect/receive the PDSCH.

Optionally, after the terminal device detects that a link fault/failure occurs in a downlink beam of the network device, if the network device has not sent a TCI state to the terminal device, the terminal device detects the PDSCH in a default manner. The default manner may be defined in a communications protocol. In this case, the reference signal meeting the second threshold includes a reference signal that meets a QCL relationship with the PDCCH. In other words, when the terminal device uses one or more specific receive beams to receive the PDCCH, the terminal device uses the one or more specific receive beams to receive the PDSCH. For a specific implementation in which the terminal device uses one or more specific receive beams to receive the PDCCH, refer to the description in step S702. Details are not described herein again. Alternatively, the reference signal meeting the second threshold includes a reference signal received by the terminal device in an initial access process. In other words, when the terminal device uses one or more specific receive beams to receive the reference signal in the initial access process, the terminal device uses the one or more specific receive beams to receive the PDSCH. Herein, the reference signal received by the terminal device in the initial access process includes but is not limited to a downlink synchronization signal block (Synchronization Signal block, SS block), and the SS block includes at least one of the following: a secondary synchronization signal (Secondary Synchronization Signal, SSS), a primary synchronization signal (Primary Synchronization Signal, PSS), and a physical broadcast channel (Physical Broadcast Channel, PBCH).

Optionally, the foregoing fourth reference signal is indicated by a default state in a transmission configuration indication table TCI table, and the TCI table is configured by the network device for the terminal device before an end moment of the second time period. The reference signal that meets the second threshold and that is indicated by the default state includes a reference signal that meets a QCL relationship with the PDCCH, or a reference signal received by the terminal device in an initial access process. This case means that the TCI table sent by the network device includes a default state, and an index value of a TCI state corresponding to the default state may be, for example, 00. The terminal device detects the PDSCH by using a receiving manner indicated by the default state. In this case, the reference signal meeting the second threshold includes a reference signal that meets a QCL relationship with the PDCCH. In other words, when the terminal device uses one or more specific receive beams to receive the PDCCH, the terminal device uses the one or more specific receive beams to receive the PDSCH. For a specific implementation in which the terminal device uses one or more specific receive beams to receive the PDCCH, refer to the description in step S702. Details are not described herein again. Alternatively, the reference signal meeting the second threshold includes a reference signal received by the terminal device in an initial access process. In other words, when the terminal device uses one or more specific receive beams to receive the reference signal in the initial access process, the terminal device uses the one or more specific receive beams to receive the PDSCH. Herein, the reference signal received by the terminal device in the initial access process includes but is not limited to a downlink synchronization signal block (Synchronization Signal block, SS block), and the SS block includes at least one of the following: a secondary synchronization signal (Secondary Synchronization Signal, SSS), a primary synchronization signal (Primary Synchronization Signal, PSS), and a physical broadcast channel (Physical Broadcast Channel, PBCH).

Optionally, before the terminal device detects, based on second information, a PDSCH during a second time period after the moment n, the method further includes: receiving, by the terminal device during the second time period, second signaling sent by the network device. The second signaling includes layer-1 signaling (including but not limited to DCI signaling). The second signaling is used to indicate a transmission configuration indication state TCI state, the TCI state is used to indicate QCL information of the PDSCH, the TCI state is a state in a TCI table, and the TCI table is configured by the network device for the terminal device before an end moment of the second time period. In this case, an implementation is as follows: If a TCI state received by the terminal device indicates a default state, the terminal device identifies the TCI state as valid, and then detects the PDSCH by using a receiving manner indicated by the default state; or if a TCI state received by the terminal device indicates a state other than a default state, the terminal device detects the PDSCH by using a receiving manner indicated by the default state, or determines that the TCI state is invalid and then detects the PDSCH by using a receiving manner indicated by the default state. Another implementation is as follows: Regardless of whether a default state is indicated by a received TCI state, the terminal device automatically interprets the TCI state as the default state, and then detects the PDSCH by using a receiving manner indicated by the default state. Herein, the detecting the PDSCH by using a receiving manner indicated by the default state includes: When the terminal device uses one or more specific transmit beams to transmit the link reconfiguration request information, the terminal device uses one or more receive beams that are corresponding to the one or more specific transmit beams to receive the PDSCH. Alternatively, the detecting the PDSCH by using a receiving manner indicated by the default state includes: When the terminal device uses one or more specific receive beams to receive the reference signal whose channel quality is higher than the second threshold, the terminal device uses the one or more specific receive beams to receive the PDSCH sent by the network device. Alternatively, the detecting the PDSCH by using a receiving manner indicated by the default state includes: When the terminal device uses one or more specific receive beams to receive the reference signal whose channel quality is the best, the terminal device uses the one or more specific receive beams to receive the PDSCH sent by the network device. Alternatively, the detecting the PDSCH by using a receiving manner indicated by the default state includes: When the terminal device uses one or more specific receive beams to receive the reference signal whose channel quality is higher than the second threshold, the terminal device uses the one or more specific receive beams to receive the PDSCH sent by the network device. Alternatively, the detecting the PDSCH by using a receiving manner indicated by the default state includes: When the terminal device uses one or more specific receive beams to receive the PDCCH, the terminal device uses the one or more specific receive beams to receive the PDSCH. Alternatively, the detecting the PDSCH by using a receiving manner indicated by the default state includes: When the terminal device uses one or more specific receive beams to receive a reference signal in an initial access process, the terminal device uses the one or more specific receive beams to receive the PDSCH. For detailed content of these manners, refer to the foregoing description. Details are not described herein again.

In this application, the second threshold may be configured by a network or be predefined.

Optionally, after the end moment of the second time period, the terminal device receives fourth signaling sent by the network device. The fourth signaling is used to indicate a TCI state in the TCI table indicated by the third signaling, and the TCI state is used to indicate QCL information of the PDSCH. In other words, the terminal device receives the PDSCH QCL information reconfigured by the network device. Then, the terminal device detects the PDSCH based on the PDSCH QCL information indicated by the fourth signaling. The fourth signaling includes layer-1 signaling (including but not limited to DCI signaling).

Optionally, the terminal device detects a first control resource set during the first time period, where the first control resource set is a resource set configured by the network device for the terminal device and used to send link reconfiguration response information.

Optionally, the terminal device detects a second control resource set after the end moment of the first time period. The second control resource set is a resource set (that is, the previous CORESET) in which a link failure occurs. This case means that the network device does not change a time-frequency resource of the second control resource set, but reconfigures QCL for the second control resource set, to recover the second control resource set. In this way, after the first time period expires, the terminal device can properly detect control information transmitted by using the second control resource set. In another implementation, the second control resource set is a resource set reconfigured by the network device. In other words, a resource set in which a link failure occurs is discarded, and a new resource set is configured to transmit control information. Both a time-frequency resource and QCL in the new resource set are different from those in the resource set in which the link failure occurs.

Optionally, the terminal device receives QCL information that is of the second control resource set and that is sent by the network device by using the first control resource set.

Optionally, the QCL information of the second control resource set is the foregoing PDCCH QCL information indicated by the first signaling.

In this application, the CORESET is a time domain resource used to transmit control information and allocated by the network device for the terminal device.

When this application is implemented, during a time period after a link failure occurs and before link communication is recovered to normal, the terminal device can properly receive the PDCCH/PDSCH delivered by the network device, thereby improving link reliability.

Figure 9:
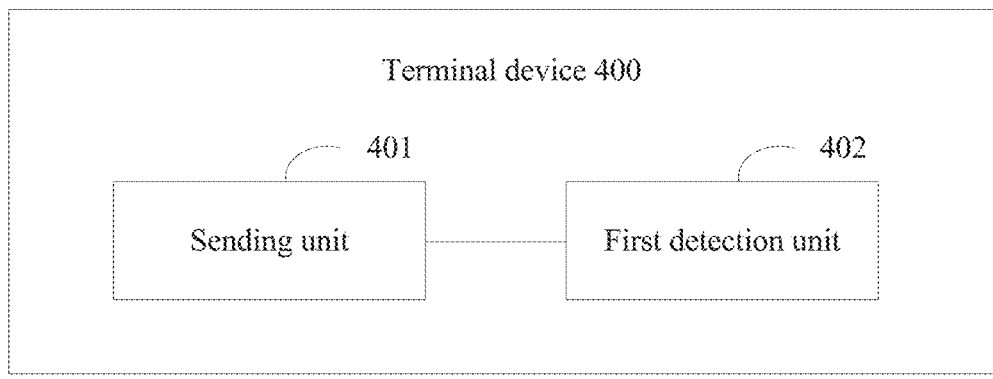
FIG. 9 is a functional block diagram of a terminal device according to this application.

Referring to FIG. 9, FIG. 9 shows a block diagram of a terminal device according to this application. As shown in FIG. 9, the terminal 400 may include a sending unit 401 and a first detection unit 402.

The sending unit 401 may be configured to send link reconfiguration request information to a network device at a moment n, where the link reconfiguration request information is used to initiate link reconfiguration.

The first detection unit 402 may be configured to detect, based on first information, a physical downlink control channel PDCCH during a first time period after the moment n; and/or detect, based on second information, a physical downlink shared channel PDSCH during a second time period after the moment n.

The first information includes quasi co-location QCL assumption information of a first reference signal and a second reference signal, the first reference signal is used to demodulate the PDCCH, and the second reference signal is a reference signal meeting a first threshold.

The second information includes quasi co-location QCL assumption information of a third reference signal and a fourth reference signal, the third reference signal is used to demodulate the PDSCH, and the fourth reference signal is a reference signal meeting a second threshold.

Optionally, the second reference signal includes a downlink reference signal associated with the link reconfiguration request information.

Optionally, the second reference signal includes a reference signal whose channel quality is higher than the first threshold and that is received by the terminal device after a link failure occurs and before the link reconfiguration request information is sent.

Alternatively, the second reference signal includes a reference signal whose channel quality is the best among reference signals whose channel quality is higher than the first threshold and that are received by the terminal device after a link failure occurs and before the link reconfiguration request information is sent.

Alternatively, the second reference signal includes a reference signal whose channel quality is higher than the first threshold and that is received by the terminal device during the first time period.

Alternatively, the second reference signal includes a reference signal whose channel quality is the best among reference signals whose channel quality is higher than the first threshold and that are received by the terminal device during the first time period.

Optionally, an end moment of the first time period is a moment at which the terminal device receives first signaling sent by the network device, the first signaling includes at least one of layer-3 signaling, layer-2 signaling, and layer-1 signaling, and the first signaling is used to indicate QCL information of the PDCCH.

Optionally, the terminal device 400 further includes:
a second detection unit, configured to detect, after the end moment of the first time period, the PDCCH based on the PDCCH QCL information indicated by the first signaling.

Optionally, the fourth reference signal includes a downlink reference signal associated with the link reconfiguration request information.

Optionally, the fourth reference signal includes a reference signal that meets a QCL relationship with the PDCCH.

Alternatively, the fourth reference signal includes a reference signal received by the terminal device in an initial access process.

Optionally, the fourth reference signal includes a reference signal whose channel quality is higher than the second threshold and that is received by the terminal device after a link failure occurs and before the link reconfiguration request information is sent.

Alternatively, the fourth reference signal includes a reference signal whose channel quality is the best among reference signals whose channel quality is higher than the second threshold and that are received by the terminal device after a link failure occurs and before the link reconfiguration request information is sent.

Alternatively, the fourth reference signal includes a reference signal whose channel quality is higher than the second threshold and that is received by the terminal device during the second time period.

Alternatively, the fourth reference signal includes a reference signal whose channel quality is the best among reference signals whose channel quality is higher than the second threshold and that are received by the terminal device during the second time period.

Optionally, the fourth reference signal is indicated by a default state in a transmission configuration indication table TCI table, and the TCI table is configured by the network device for the terminal device before an end moment of the second time period.

The fourth reference signal indicated by the default state includes a reference signal that meets a QCL relationship with the PDCCH, or a reference signal received by the terminal device in an initial access process.

Optionally, the terminal device 400 further includes:
a first receiving unit, configured to receive, during the second time period, second signaling sent by the network device, where the second signaling includes layer-1 signaling, the second signaling is used to indicate a transmission configuration indication state TCI state, the TCI state is used to indicate QCL information of the PDSCH, the TCI state is a state in a TCI table, and the TCI table is configured by the network device for the terminal device before an end moment of the second time period.

That the first detection unit 402 is configured to detect, based on second information, a physical downlink shared channel PDSCH during a second time period after the moment n includes: detecting, based on default QCL information, the PDSCH during the second time period after the moment n, where the default QCL information is the second information.

Alternatively, that the first detection unit 402 is configured to detect, based on second information, a physical downlink shared channel PDSCH during a second time period after the moment n includes: assuming, during the second time period after the moment n, that PDSCH QCL indicated by the TCI state is invalid, and detecting the PDSCH based on default QCL information, where the default QCL information is the second information.

Optionally, an end moment of the second time period is a moment at which the terminal device receives third signaling sent by the network device, the third signaling includes at least one of layer-3 signaling and layer-2 signaling, the third signaling is used to indicate a TCI table of the PDSCH, and the TCI table is used to indicate candidate QCL information of the PDSCH.

Optionally, the terminal device 400 further includes:
a second receiving unit, configured to receive, after the end moment of the second time period, fourth signaling sent by the network device, where the fourth signaling includes layer-1 signaling, the fourth signaling is used to indicate a TCI state in the TCI table indicated by the third signaling, and the TCI state is used to indicate QCL information of the PDSCH; and
a third detection unit, configured to detect the PDSCH based on the PDSCH QCL information indicated by the fourth signaling.

Optionally, the terminal device 400 further includes:
a fourth detection unit, configured to detect a first control resource set during the first time period, where the first control resource set is a resource set configured by the network device for the terminal device and used to send link reconfiguration response information.

Optionally, the terminal device 400 further includes: a fifth detection unit, configured to detect a second control resource set after the end moment of the first time period. The second control resource set is a resource set in which a link failure occurs.

Optionally, the terminal device 400 further includes: a third receiving unit, configured to receive QCL information that is of the second control resource set and that is sent by the network device by using the first control resource set.

Optionally, the first threshold and the second threshold may be configured by the network device or be predefined. The foregoing first threshold and the second threshold may be equal or may be unequal.

It may be understood that for detailed implementation of function units included in the terminal 400, refer to the foregoing embodiments. Details are not described herein again.

Figure 10:
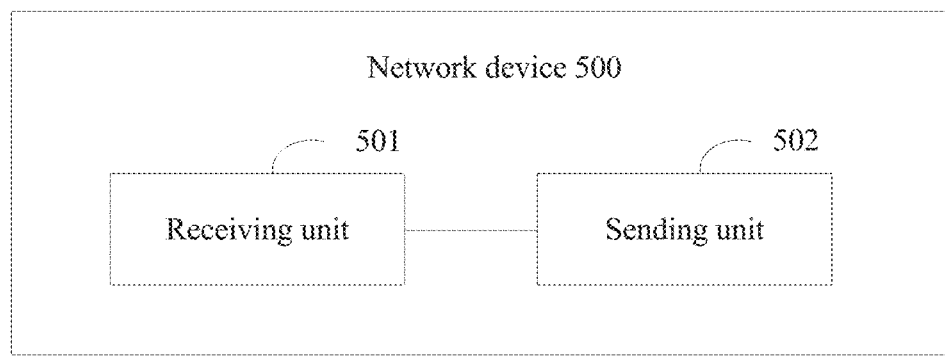
FIG. 10 is a functional block diagram of a network device according to this application.

Referring to FIG. 10, FIG. 10 shows a block diagram of a network device according to this application. As shown in FIG. 10, the network 500 may include: a receiving unit 501 and a sending unit 502.

The receiving unit 501 is configured to receive link reconfiguration request information sent by a terminal device at a moment n, where the link reconfiguration request information is used to initiate link reconfiguration.

The sending unit 502 is configured to send, based on first information, a physical downlink control channel PDCCH during a first time period after the moment n, where the first information includes quasi co-location QCL assumption information of a first reference signal and a second reference signal, the first reference signal is used to demodulate the PDCCH, and the second reference signal is a reference signal meeting a first threshold; and/or the sending unit 502 is configured to send, based on second information, a physical downlink shared channel PDSCH during a first time period after the moment n, where the second information includes quasi co-location QCL assumption information of a third reference signal and a fourth reference signal, the third reference signal is used to demodulate the PDSCH, and the fourth reference signal is a reference signal meeting a second threshold.

Optionally, the reference signal meeting the first threshold includes a downlink reference signal associated with the link reconfiguration request information.

Alternatively, the second reference signal includes a reference signal whose channel quality is higher than the first threshold and that is received by the terminal device after a link failure occurs and before the link reconfiguration request information is sent.

Alternatively, the second reference signal includes a reference signal whose channel quality is the best among reference signals whose channel quality is higher than the first threshold and that are received by the terminal device after a link failure occurs and before the link reconfiguration request information is sent.

Alternatively, the second reference signal includes a reference signal whose channel quality is higher than the first threshold and that is received by the terminal device during the first time period.

Alternatively, the second reference signal includes a reference signal whose channel quality is the best among reference signals whose channel quality is higher than the first threshold and that are received by the terminal device during the first time period.

Optionally, an end moment of the first time period is a moment at which the terminal device receives first signaling sent by the network device, the first signaling includes at least one of layer-3 signaling, layer-2 signaling, and layer-1 signaling, and the first signaling is used to indicate QCL information of the PDCCH.

Optionally, the sending unit 502 is further configured to:
send, after the end moment of the first time period, the PDCCH based on the PDCCH QCL information indicated by the first signaling.

Optionally, the fourth reference signal includes a downlink reference signal associated with the link reconfiguration request information.

Alternatively, the fourth reference signal includes a reference signal that meets a QCL relationship with the PDCCH.

Alternatively, the fourth reference signal includes a reference signal received by the terminal device in an initial access process.

Alternatively, the fourth reference signal includes a reference signal whose channel quality is higher than the second threshold and that is received by the terminal device after a link failure occurs and before the link reconfiguration request information is sent.

Alternatively, the fourth reference signal includes a reference signal whose channel quality is the best among reference signals whose channel quality is higher than the second threshold and that are received by the terminal device after a link failure occurs and before the link reconfiguration request information is sent.

Alternatively, the fourth reference signal includes a reference signal whose channel quality is higher than the second threshold and that is received by the terminal device during the second time period.

Alternatively, the fourth reference signal includes a reference signal whose channel quality is the best among reference signals whose channel quality is higher than the second threshold and that are received by the terminal device during the second time period.

Optionally, the fourth reference signal is indicated by a default state in a transmission configuration indication table TCI table, and the TCI table is configured by the network device for the terminal device before an end moment of the second time period.

The fourth reference signal indicated by the default state includes a reference signal that meets a QCL relationship with the PDCCH, or a reference signal received by the terminal device in an initial access process.

Optionally, the sending unit 502 is further configured to:
send second signaling to the terminal device during the second time period, where the second signaling includes layer-1 signaling, the second signaling is used to indicate a transmission configuration indication state TCI state, the TCI state is used to indicate QCL information of the PDSCH, the TCI state is a state in a TCI table, and the TCI table is configured by the network device for the terminal device before an end moment of the second time period.

Optionally, an end moment of the second time period is a moment at which the terminal device receives third signaling sent by the network device, the third signaling includes at least one of layer-3 signaling and layer-2 signaling, the third signaling is used to indicate a TCI table of the PDSCH, and the TCI table is used to indicate candidate QCL information of the PDSCH.

Optionally, the sending unit 502 is further configured to:
send fourth signaling to the terminal device after the end moment of the second time period, where the fourth signaling includes layer-1 signaling, the fourth signaling is used to indicate a TCI state in the TCI table indicated by the third signaling, and the TCI state is used to indicate QCL information of the PDSCH; and
send the PDSCH based on the PDSCH QCL information indicated by the fourth signaling.

Optionally, the sending unit 502 is further configured to:
send, by the network device, a first control resource set during the first time period, where the first control resource set is a resource set configured by the network device for the terminal device and used to send link reconfiguration response information.

Optionally, the sending unit 502 is further configured to:
send, by the network device, a second control resource set after the end moment of the first time period, where the second control resource set is a resource set in which a link failure occurs.

Optionally, the sending unit 502 is further configured to:
send, by the network device, QCL information of the second control resource set to the terminal device by using the first control resource set.

It may be understood that for detailed implementation of function units included in the network device 500, refer to the foregoing embodiments. Details are not described herein again.

In conclusion, when the technical solutions provided in this application are implemented, during a time period after a link failure occurs and before link communication is recovered to normal, the terminal device can properly receive the PDCCH/PDSCH delivered by the network device, thereby improving link reliability.

Methods or algorithm steps described in combination with the content disclosed in this embodiment of the present invention may be implemented by hardware, or may be implemented by a processor by executing a software instruction. The software instruction may include a corresponding software module. The software module may be stored in a RAM, a flash memory, a ROM, an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or a storage medium in any other form well known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a transceiver or a relay device. Certainly, the processor and the storage medium may act as discrete components in a wireless access network device or a terminal device.

A person skilled in the art should be aware that in the foregoing one or more examples, functions described in the embodiments of the present invention may be implemented by hardware, software, firmware, or any combination thereof. When the present invention is implemented by software, the functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and beneficial effects of the embodiments of the present invention are further described in detail in the foregoing specific implementations. It should be understood that the foregoing descriptions are merely specific implementations of the embodiments of the present invention, but are not intended to limit the protection scope of the embodiments of the present invention. Any modification, equivalent replacement, or improvement made based on the technical solutions of the embodiments of the present invention shall fall within the protection scope of the embodiments of the present invention.

What is claimed is:

1. A signal transmission method, comprising:
    sending, after a link failure occurs, by a terminal device, link reconfiguration request information to a network device at a moment n;
    receiving, by the terminal device, first signaling sent by the network device at a second moment, wherein the first signaling indicates first information that comprises quasi co-location (QCL) information of a first reference signal and a second reference signal, the first reference signal is used to demodulate a physical downlink control channel (PDCCH), the first reference signal comprises a demodulation reference signal (DMRS), the second reference signal comprises a channel state information reference signal (CSI-RS) or a synchronization signal block (SSB), and a channel quality of the second reference signal is equal to or higher than a first threshold; and
    detecting, after sending the link reconfiguration request information, by the terminal device based on the QCL information of the PDCCH indicated by the first information, the PDCCH during a first time period after the moment n and until the second moment, wherein the second moment is an end moment of the first time period, wherein detecting the PDCCH based on the QCL information of the PDCCH indicated by the first information comprises:
        using one or more specific receive beams to receive the second reference signal; and
        using the same one or more specific receive beams to receive or demodulate the PDCCH.

2. The method according to claim 1, wherein the second reference signal comprises a downlink reference signal associated with the link reconfiguration request information.

3. The method according to claim 1,
    wherein the first signaling comprises at least one of radio resource control (RRC) signaling, Media Access Control control element (MAC CE) signaling, or downlink control information (DCI) signaling.

4. The method according to claim 1, further comprising:
    detecting, by the terminal device, a first control resource set during the first time period, wherein the first control resource set is configured by the network device for the terminal device and used to send link reconfiguration response information.

5. The method according to claim 4, further comprising:
    detecting, by the terminal device, a second control resource set after the end moment of the first time period, wherein the second control resource set is a resource set in which a link failure occurs.

6. A terminal device, comprising:
    at least one processor; and
    a non-transitory computer-readable storage medium coupled to the at least one processor and storing programming instructions for execution by the at least one processor, wherein the programming instructions instruct the at least one processor to:
    send, after a link failure occurs, link reconfiguration request information to a network device at a moment n;
    receive first signaling sent by the network device at a second moment, wherein the first signaling indicates first information that comprises quasi co-location (QCL) information of a first reference signal and a second reference signal, the first reference signal is used to demodulate a physical downlink control channel (PDCCH), the first reference signal comprises a demodulation reference signal (DMRS), the second reference signal comprises a channel state information reference signal (CSI-RS) or a synchronization signal block (SSB), and a channel quality of the second reference signal is equal to or higher than a first threshold; and
    detect, after sending the link reconfiguration request information, based on the QCL information of the PDCCH indicated by the first information, the PDCCH during a first time period after the moment n and until the second moment, wherein the second moment is an end moment of the first time period, wherein detecting the PDCCH based on the QCL information of the PDCCH indicated by the first information comprises:
        using one or more specific receive beams to receive the second reference signal; and using the same one or more specific receive beams to receive or demodulate the PDCCH.

7. The terminal device according to claim 6, wherein the second reference signal comprises a downlink reference signal associated with the link reconfiguration request information.

8. The terminal device according to claim 6, wherein the first signaling comprises at least one of radio resource control RRC signaling, Media Access Control control element MAC CE signaling, or downlink control information DCI signaling, and the first signaling is used to indicate QCL information of the PDCCH.

9. The terminal device according to claim 6, wherein the programming instructions instruct the at least one processor to detect a first control resource set during the first time period, wherein the first control resource set is configured by the network device for the terminal device and used to send link reconfiguration response information.

10. The terminal device according to claim 9, wherein the programming instructions instruct the at least one processor to detect a second control resource set after the end moment of the first time period, wherein the second control resource set is a resource set in which a link failure occurs.

11. A communications system, comprising:
a terminal device; and
a network device,
wherein the terminal device comprises at least one processor; and a non-transitory computer-readable storage medium coupled to the at least one processor and storing programming instructions for execution by the at least one processor, wherein the programming instructions instruct the at least one processor to:
send, after a link failure occurs, link reconfiguration request information to the network device at a moment n;
receive first signaling sent by the network device at a second moment, wherein the first signaling indicates first information that comprises quasi co-location (QCL) information of a first reference signal and a second reference signal, the first reference signal is used to demodulate a physical downlink control channel (PDCCH), the first reference signal comprises a demodulation reference signal (DMRS), the second reference signal comprises a channel state information reference signal (CSI-RS) or a synchronization signal block (SSB), and a channel quality of the second reference signal is equal to or higher than a first threshold; and
detect, after sending the link reconfiguration request information, based on the QCL information of the PDCCH indicated by the first information, the PDCCH during a first time period after the moment n and until the second moment, wherein the second moment is an end moment of the first time period, wherein detecting the PDCCH based on the QCL information of the PDCCH indicated by the first information comprises:
using one or more specific receive beams to receive the second reference signal; and
using the same one or more specific receive beams to receive or demodulate the PDCCH.

12. A non-transitory computer-readable storage medium having instructions recorded thereon which, when executed by at least one processor, cause the at least one processor to perform operations comprising:

sending, after a link failure occurs, by a terminal device, link reconfiguration request information to a network device at a moment n;
receiving first signaling sent by the network device at a second moment, wherein the first signaling indicates first information that comprises quasi co-location (QCL) information of a first reference signal and a second reference signal, the first reference signal is used to demodulate a physical downlink control channel (PDCCH), the first reference signal comprises a demodulation reference signal (DMRS), the second reference signal comprises a channel state information reference signal (CSI-RS) or a synchronization signal block (SSB), and a channel quality of the second reference signal is equal to or higher than a first threshold; and
detecting, after sending the link reconfiguration request information, by the terminal device based on the QCL information of the PDCCH indicated by the first information, the PDCCH during a first time period after the moment n and until the second moment, wherein the second moment is an end moment of the first time period, wherein detecting the PDCCH based on the QCL information of the PDCCH indicated by the first information comprises:
using one or more specific receive beams to receive the second reference signal; and
using the same one or more specific receive beams to receive or demodulate the PDCCH.

13. A communication device, comprising:
one or more memories configured to store instructions; and
one or more processors configured to execute the instructions to performs operations comprising:
sending, after a link failure occurs, by a terminal device, link reconfiguration request information to a network device at a moment n;
receiving first signaling sent by the network device at a second moment, wherein the first signaling indicates first information that comprises quasi co-location (QCL) information of a first reference signal and a second reference signal, the first reference signal is used to demodulate a physical downlink control channel (PDCCH), the first reference signal comprises a demodulation reference signal (DMRS), the second reference signal comprises a channel state information reference signal (CSI-RS) or a synchronization signal block (SSB), and a channel quality of the second reference signal is equal to or higher than a first threshold; and
detecting, after sending the link reconfiguration request information, by the terminal device based on the QCL information of the PDCCH indicated by the first information, the PDCCH during a first time period after the moment n and until the second moment, wherein the second moment is an end moment of the first time period, wherein detecting the PDCCH based on the QCL information of the PDCCH indicated by the first information comprises:
using one or more specific receive beams to receive the second reference signal; and
using the same one or more specific receive beams to receive or demodulate the PDCCH.

* * * * *